United States Patent
Dou et al.

(10) Patent No.: US 11,600,870 B2
(45) Date of Patent: Mar. 7, 2023

(54) SYSTEMS AND METHODS FOR EVALUATING ELECTROLYTE WETTING AND DISTRIBUTION

(71) Applicant: Liminal Insights, Inc., Emeryville, CA (US)

(72) Inventors: Shan Dou, Berkeley, CA (US); Andrew G. Hsieh, Berkeley, CA (US); Shaurjo Biswas, El Cerrito, CA (US); Barry J. Van Tassell, El Cerrito, CA (US); Elizabeth M. Lee, Oakland, CA (US); Dennis Yu, Berkeley, CA (US); Jason Y. Yu, Emeryville, CA (US)

(73) Assignee: Liminal Insights, Inc., Emeryville, CA (US)

( * ) Notice: Subject to any disclaimer, the term of this patent is extended or adjusted under 35 U.S.C. 154(b) by 376 days.

(21) Appl. No.: 16/826,718

(22) Filed: Mar. 23, 2020

(65) Prior Publication Data
US 2020/0358147 A1 Nov. 12, 2020

Related U.S. Application Data

(60) Provisional application No. 62/821,605, filed on Mar. 21, 2019.

(51) Int. Cl.
*H01M 10/48* (2006.01)
*G01N 29/06* (2006.01)
*G01F 23/296* (2022.01)

(52) U.S. Cl.
CPC ...... *H01M 10/484* (2013.01); *G01N 29/0654* (2013.01)

(58) Field of Classification Search
CPC ........... H01M 10/486; H01M 10/4285; H01M 10/48; H01M 2010/4271; H01M 10/484;
(Continued)

(56) References Cited

U.S. PATENT DOCUMENTS

| 4,442,700 A | * | 4/1984 | Swoboda | G01N 9/24 73/32 A |
| 2005/0001628 A1 | * | 1/2005 | Jones | H01M 6/505 324/432 |

(Continued)

FOREIGN PATENT DOCUMENTS

| DE | 102018001502 A1 | 8/2018 |
| JP | 2010181290 A | 8/2010 |
| JP | 2017045547 A | 3/2017 |

OTHER PUBLICATIONS

Gold Lukas et al, "Probing lithium-ion batteries' state-of-charge using ultrasonic transmission—Concept and Taboratory testing", Journal of Power Sources, Elsevier SA, CH,vol. 343, Feb. 9, 2017 (Feb. 9, 2017), p. 536-544, XP029918384 DOI: 10.1016/J.JPOWSOUR.2017.01.090 external link ISSN:0378-7753 sections 2.2, 3.1;figures 1-5.
(Continued)

*Primary Examiner* — Imran Akram
(74) *Attorney, Agent, or Firm* — Polsinelli LLP

(57) ABSTRACT

Systems and techniques for measuring process characteristics including electrolyte distribution in a battery cell. A non-destructive method for analyzing a battery cell includes determining acoustic features at two or more locations of the battery cell, the acoustic features based on one or more of acoustic signals travelling through at least one or more portions of the battery cell during one or more points in time or responses to the acoustic signals obtained during one or more points in time, wherein the one or more points in time correspond to one or more stages of electrolyte distribution in the battery cell. One or more characteristics of the battery cell are determined based on the acoustic features at the two or more locations of the battery cell.

22 Claims, 9 Drawing Sheets

(58) Field of Classification Search
CPC .. H01M 6/5044; H01M 6/5083; G01N 29/46; G01N 2291/106; G01N 29/043; G01N 29/07
See application file for complete search history.

(56) References Cited

U.S. PATENT DOCUMENTS

| | | | | |
|---|---|---|---|---|
| 2010/0310907 A1* | 12/2010 | Miller | ............... | H01M 4/485 429/90 |
| 2011/0183168 A1* | 7/2011 | Johnnie | ............... | G01F 23/296 429/93 |
| 2013/0335094 A1* | 12/2013 | Adams | ............... | G01R 31/382 324/426 |
| 2016/0197382 A1* | 7/2016 | Sood | ............... | G01N 29/223 73/620 |
| 2016/0223498 A1* | 8/2016 | Steingart | ............ | G01N 29/4436 |
| 2016/0245875 A1* | 8/2016 | Kircheva | ............ | G01R 31/367 |
| 2017/0038344 A1* | 2/2017 | Capus | ................ | G01S 15/89 |
| 2018/0287224 A1* | 10/2018 | Ryoo | ............... | H01M 10/486 |
| 2019/0049518 A1* | 2/2019 | Shen | ................ | H01M 10/48 |
| 2020/0106137 A1* | 4/2020 | Murphy | ............... | H01M 10/42 |
| 2021/0194070 A1* | 6/2021 | Gitis | ................ | H01M 10/48 |

OTHER PUBLICATIONS

International Search Report dated Jul. 6, 2021.

\* cited by examiner

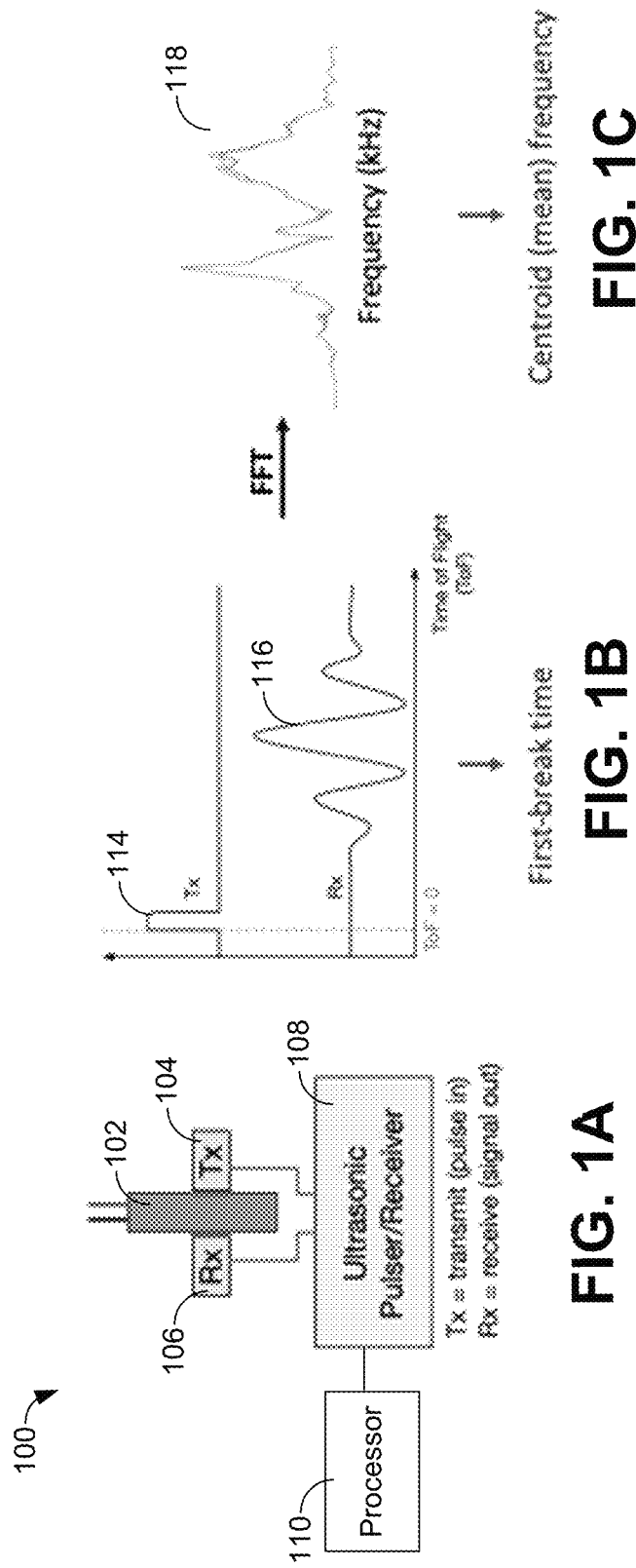

SYSTEMS AND METHODS FOR EVALUATING ELECTROLYTE WETTING AND DISTRIBUTION

CROSS-REFERENCE TO RELATED APPLICATIONS

The present Application for Patent claims the benefit of Provisional Patent Application No. 62/821,605 entitled "SYSTEMS AND METHODS FOR EVALUATING ELECTROLYTE WETTING AND DISTRIBUTION" filed Mar. 21, 2019, expressly incorporated herein by reference in its entirety.

STATEMENT REGARDING FEDERALLY SPONSORED RESEARCH OR DEVELOPMENT

This invention was made with U.S. Federal government support under Grant No. AR0000866 awarded by the Department of Energy, Advanced Research Projects Agency. The U.S. Federal government has certain rights in the invention.

FIELD OF DISCLOSURE

Disclosed aspects are directed to non-invasive and non-destructive techniques for evaluating electrolyte characteristics such as wetting and distribution in an electrochemical system.

BACKGROUND

There is a significant and growing pressure on manufacturers of batteries, such as lithium-ion batteries (LIBs), to decrease production costs. This pressure is seen to originate from rapidly-expanding production capacities worldwide, as well as increased demands on battery-driven systems (e.g., electric vehicles) to reduce prices. For instance, electric vehicles are expected to drop prices by over 20% to be competent with mass-market non-battery-driven vehicles such as internal combustion engine vehicles. Additionally, the electric vehicle industry is trending towards larger-size batteries and thicker, denser electrodes. However, these trends also lead to the increasing demands on higher quality, safety, and reliability of batteries, while continuing to reduce production costs.

Looking at production costs in more detail, the final series of processes steps in the production of a battery cell, or "cell finishing" as known in the art, can contribute to about 40% of the total production costs for the battery cells (excluding raw material costs) in a typical manufacturing setup. The following steps are generally involved in battery cell finishing: electrolyte filling and soaking, pre-charging, formation, aging, and final end-of-line quality testing. In particular, the electrolyte filling and soaking steps are critical to the overall quality, performance, and safety of the battery cells being produced, as the electrolyte is the primary medium through which positive charges flow through the battery cell during operation.

In the electrolyte filling and soaking steps, ensuring a uniform distribution of electrolyte is important to battery quality, expected future performance, and safety, collectively referred to as battery health. If a battery cell has any areas where the electrolyte has not fully saturated or soaked through, i.e., if there is unevenness in the distribution of electrolyte, "dry spots" may result in such areas with insufficient electrolyte. These dry spots may lead to non-uniform current distribution across the electrode area during battery cell formation and operation. In turn, the non-uniform current distribution can result in performance degradation of the battery cell (e.g., due to local mechanical separation or lithium metal plating). In extreme cases, lithium metal plating in the form of dendrites can short-circuit the electrodes internally, and sometimes results in catastrophic failure in the form of thermal runaway of the battery cell.

Under ambient conditions, and even at elevated temperatures, the time taken for the electrolyte to be fully distributed throughout a battery cell may be relatively long, typically requiring hours of soaking of the electrolyte to achieve a substantially full distribution. Electrolyte wetting is mainly driven by capillary forces, which are typically not strong enough for liquid electrolytes to completely saturate all the pores within the battery cell or a stack of battery cell components. Moreover, saturating the pores faces further challenges when the sizes of the pores decrease. Electrolyte composition and viscosity can also have a significant influence on electrolyte distribution. For example, an electrolyte with lower viscosity may achieve better distribution than an electrolyte with higher viscosity. Additionally, if the connectivity of the pore structures in some regions is so poor that the electrolyte is faced with restrictions in pathways to flow through, these regions may never be wetted. In electrodes, pore size distribution and pore accessibility (and thus wetting behavior) are affected by upstream process parameters, such as the particle size of constituent electrode materials, thickness of the electrode layer, carrier solvent used when casting electrode slurries, speed and temperature during drying, compression pressure during calendaring, vacuum drying of electrodes, etc. Another reason for long wetting times can be poor wettability of some of the battery cell components, based, for example, on poor compatibility between the surface energies of the electrolyte and the battery cell components. Poor wettability of this nature may be influenced by electrode surface coatings; separator materials, porosity, coatings, and treatment; and electrolyte composition, and additives.

Some electrolyte filling and soaking processes that are currently used in battery cell production (as well as during prototyping and process development) to accelerate the flow or infiltration of electrolyte into the battery cell include: filling the battery cells under low pressure conditions in a vacuum chamber, having multiple fill and vacuum steps, soaking under elevated temperatures, press rolling or vibrating during and after electrolyte filling, and soaking with additional stack pressure (e.g. where a pouch type cell is sandwiched and compressed between flat plates). These conventional methods may demonstrate a positive effect on reducing filling and wetting time, but their efficacy has not been quantified systematically. There remains a need for non-destructive, scalable methods for monitoring, visualizing, and analyzing the dynamic filling and soaking process of electrolytes, e.g., in real time, during the course of the dynamic filling and soaking process. Such techniques can be useful in ensuring battery health, as well as in providing quantitative data for process improvements.

Currently, assessing the time taken for the electrolyte to be fully distributed throughout the battery cell, also referred to as "wetting time," is an empirical, expensive, and time-consuming effort. Such assessments typically involve producing a batch of battery cells, injecting the batch of battery cells with a known amount of electrolyte, and sequentially disassembling subsets of cells of the batch of battery cells after varying lengths of time have elapsed since the end of the electrolyte injection. By taking apart the battery cells, which is a destructive process, the electrode surfaces can be visually inspected to determine the extent of electrolyte wetting. Based on a series of such destructive tests, an average wetting time can be estimated, where in some cases a safety factor can be added to the average wetting time. The average wetting time (with a safety factor optionally added) can be used as the estimated wetting time for battery cells during large-volume production of the battery cells.

Given the dearth of alternative, non-invasive methods for characterizing the electrolyte wetting quality in a time-efficient manner, the current techniques (e.g., during process development) involve repeatedly executing the above-described expensive and time-consuming processes for determining wetting time for evaluating the influence of different material or battery cell components (e.g., a new separator) or upstream process parameters (e.g., coating thicker electrode layers) used in the battery cell production.

Electrochemical impedance spectroscopy and neutron radiography are known analytical methods that have been used to assess electrolyte wetting quality in lithium ion battery cells in laboratory settings. In production environments, electrical AC impedance tests can be used to characterize the electrolyte distribution, where low impedance values over time are assumed to indicate uniform wetting of the electrodes. However, as with other known electrical methods of analysis, AC impedance measurements are electrode-averaged measurements and are likely to be dominated by measurements from normal/properly-filled areas of the battery cell and potentially insensitive to small dry spots that nevertheless have a major influence on long-term battery performance Thus, information about small dry spots or void spaces, e.g., between electrode layers or within porous electrode or separator layers, may be overlooked due to being overshadowed by the AC impedance measurements obtained from the normal areas. Neutron radiography can help visualize the electrolyte flow within the cell in-situ non-invasively by potentially introducing radio isotopes in the electrolyte. However, the use of neutron radiography in cell manufacturing is limited by the availability of neutron sources at scale. Contamination of the electrolyte can also hinder neutron radiography techniques.

Electrolyte fill and soaking are also recognized as critical process steps in battery cell production because the evenness of electrolyte distribution is seen to directly influence the yield rate of expensive downstream processes like formation and aging. The quality of electrolyte wetting of the pores of the electrodes and separators of battery cells has a high impact on structures such as a solid electrolyte interphase (SEI), which is a passivation layer formed on electrode surfaces from decomposition products of electrolytes Similar to electrolyte distribution, the evenness and quality of SEI formation has a strong influence on the overall quality, performance, and safety of the battery cells being produced. The electrolyte wetting quality also affects the aging behavior of the battery cell (e.g., where aging of the battery cell can be measured as a rate of voltage fade while the battery cell is electrically isolated from external circuits). Poorly wetted areas influence battery cell performance by increasing the internal ionic resistance and decreasing the discharge capacity, cycle life, and safety of the battery cell. The amount and distribution of electrolyte within the battery cell is important for the overall performance of the battery cell. Flooding or depletion of the battery cell electrolyte may severely impair battery cell performance and may cause failures. Conventional techniques, which rely on analyzing electrolyte wetting over lengthy formation cycles, do not sufficiently address the numerous challenges outlined above.

SUMMARY

Systems and methods for observing, monitoring, and evaluating the migration and distribution of electrolyte in a battery cell are disclosed. Measuring acoustic features or properties at multiple points across a battery cell's area and analyzing the change in acoustic features, both as a function of spatial position and soaking time, is used to evaluate the electrolyte wetting process and battery cell-level quality and uniformity in a fast, non-invasive manner. The acoustic features may be based on one or more of acoustic signals travelling through at least one or more portions of the battery cell during one or more points in time or responses to the acoustic signals obtained during one or more points in time, where the responses include vibrational responses to the acoustic signals transmitted into the battery cell. The disclosed techniques can also provide dynamic information that battery cell manufacturers can use to design new production process steps, make process improvements, optimize process parameters, catch drift in process quality, carry out smarter predictive maintenance, improve yield and reduce scrap, and screen out low quality battery cells much earlier than previously possible.

According to some examples, a method of analyzing a battery cell is provided, the method comprising: determining acoustic features at two or more locations of the battery cell, the acoustic features based on one or more of acoustic signals travelling through at least one or more portions of the battery cell during one or more points in time or responses to the acoustic signals obtained during one or more points in time, wherein the one or more points in time correspond to one or more stages of electrolyte distribution in the battery cell; and determining one or more characteristics of the battery cell based on the acoustic features at the two or more locations of the battery cell.

In some examples, a non-transitory computer-readable medium is provided, having stored thereon computer-readable instructions that, upon being executed by one or more processors, cause the one or more processors to: determine acoustic features at two or more locations of the battery cell, the acoustic features based on one or more of acoustic signals travelling through at least one or more portions of the battery cell during one or more points in time or responses to the acoustic signals obtained during one or more points in time, wherein the one or more points in time correspond to one or more stages of electrolyte distribution in the battery cell; and determine one or more characteristics of the battery cell based on the acoustic features at the two or more locations of the battery cell.

In another example, a system is provided, comprising: one or more processors; and memory including instructions that, upon being executed by the processor one or more processors, cause the system to: determine acoustic features at two or more locations of the battery cell, the acoustic features based on one or more of acoustic signals travelling through at least one or more portions of the battery cell during one or more points in time or responses to the acoustic signals obtained during one or more points in time, wherein the one or more points in time correspond to one or more stages of electrolyte distribution in the battery cell; and determine one or more characteristics of the battery cell based on the acoustic features at the two or more locations of the battery cell.

Some examples of the method, non-transitory computer-readable medium, and/or the system further comprise creating a two-dimensional map based on the acoustic features at the two or more locations, wherein determining the one or more characteristics of the battery cell based on the acoustic features at the two or more locations of the battery cell comprises determining the one or more characteristics of the battery cell based on the two-dimensional map.

Some examples of the method, non-transitory computer-readable medium, and/or the system further comprise creating a matrix with two or more two-dimensional maps created using acoustic features obtained at two or more points in time from one or more battery cells at two or more electrolyte fill levels.

Some examples of the method, non-transitory computer-readable medium, and/or the system further comprise applying a dimensionality reduction algorithm to the acoustic features to determine a reduced-dimension score.

Some examples of the method, non-transitory computer-readable medium, and/or the system further comprise plotting the reduced-dimension score as a function of soaking times for electrolyte distribution in the battery cell, wherein the one or more characteristics comprise ideal soaking times for the battery cell, and the reduced-dimension score comprises an inhomogeneity index or an electrolyte distribution homogeneity index.

In some examples of the method, non-transitory computer-readable medium, and/or the system, the one or more points in times belong to one or more of process steps comprising soaking, formation, and self-discharge aging of the battery cell, or to one or more charge/discharge cycles of the battery cell.

In some examples of the method, non-transitory computer-readable medium, and/or the system, the one or more characteristics include one or more of battery cell quality, ideal soaking time, process drifts, or manufacturing defects.

In some examples of the method, non-transitory computer-readable medium, and/or the system, the manufacturing defects comprise one or more of contamination, dry spots, voids, electrode and separator folds or tears.

In some examples of the method, non-transitory computer-readable medium, and/or the system, the one or more characteristics include battery cell performance corresponding to one or more of teardown analysis, formation capacity, Electrochemical Impedance Spectroscopy (EIS), self-discharge aging, or charge/discharge cycling.

Some examples of the method, non-transitory computer-readable medium, and/or the system further comprise determining one or more process parameters for electrolyte filling of the battery cell based on the one or more characteristics, the one or more process parameters comprising one or more of a number of fill/vacuum cycles, a fill amount of electrolyte per fill step, vacuum pressure, fill temperature, or electrolyte injection distribution for the battery cell.

Some examples of the method, non-transitory computer-readable medium, and/or the system further comprise determining one or more pre-electrolyte-fill (or pre-fill) parameters for implementing upstream (prior to the electrolyte fill step) process and materials optimization of the battery cell based on the one or more characteristics, the one or more pre-fill parameters comprising one or more of an electrodes materials and composition ratio, electrode porosity, separator type, materials, porosity and coating, electrolyte chemistry, electrolyte composition, electrolyte viscosity, electrode additives or electrolyte additives.

Some examples of the method, non-transitory computer-readable medium, and/or the system further comprise determining one or more soaking parameters for a soaking process of the electrolyte in the battery cell based on the one or more characteristics, the one or more soaking parameters comprising one or more of soaking temperature, stack pressure, voltage during soaking, battery cell orientation, or agitation of the battery cell.

In some examples of the method, non-transitory computer-readable medium, and/or the system, the acoustic features are determined from one or more time-domain characteristics, one or more frequency-domain characteristics, one or more time-frequency domain characteristics, and/or one or more wavelet domain characteristics of the transmitted acoustic signals or the response signals or combinations thereof.

In some examples of the method, non-transitory computer-readable medium, and/or the system, the acoustic features, which can span time, frequency, time-frequency, and/or wavelet domains, can include spectral centroid frequency, spectral centroid time, root-mean-square amplitude, first-break time, first-peak time and amplitude, signal entropy, signal flatness, energy band ratios, spectral fluxes, band widths, roll-off frequencies.

In some examples of the method, non-transitory computer-readable medium, and/or the system, the acoustic signals travelling through at least one or more portions of the battery cell comprise one or more of acoustic signals transmitted into the battery cell or reflections of the acoustic signals transmitted into the battery cell.

In some examples of the method, non-transitory computer-readable medium, and/or the system, the responses to the acoustic signals comprise one or more of responses to the acoustic signals transmitted into the battery cell or responses to the reflections of the acoustic signals transmitted into the battery cell.

In some examples of the method, non-transitory computer-readable medium, and/or the system, the acoustic features are determined from one or more time-domain characteristics, one or more frequency-domain characteristics, or one or more time-frequency domain characteristics of the transmitted acoustic signals or the response signals or combinations thereof.

Some examples of the method, non-transitory computer-readable medium, and/or the system further comprise comparing the acoustic features to a reference set of acoustic features, the reference set of acoustic features obtained at corresponding two or more locations of a reference battery cell.

In some examples of the method, non-transitory computer-readable medium, and/or the system, determining one or more characteristics of the battery cell is further based on comparing the acoustic features to predetermined corresponding threshold values.

In some examples of the method, non-transitory computer-readable medium, and/or the system, the one or more characteristics comprise a quality of a solid electrolyte interphase (SEI) layer of the battery cell.

Some examples of the method, non-transitory computer-readable medium, and/or the system further comprise determining one or more insights based on the determined one or more characteristics, the insights comprising hints for one or more of process design, process optimization, process monitoring, control, or decisions about downstream processes for manufacturing one or more battery cells.

In some examples, another method of analyzing a battery cell is provided, the method comprising: determining acoustic features at one or more locations of the battery cell, the acoustic features based on one or more of acoustic signals travelling through at least one or more portions of the battery cell during two or more points in time or responses to the acoustic signals obtained during two or more points in time, wherein the two or more points in time correspond to one or more stages of electrolyte distribution in the battery cell; and determining one or more characteristics of the battery cell based on the acoustic features at the one or more locations of the battery cell.

BRIEF DESCRIPTION OF THE DRAWINGS

The accompanying drawings are presented to aid in the description of various aspects of the invention and are provided solely for illustration and not limitation.

FIG. 1A illustrates an apparatus for acoustic testing of a battery cell, according to aspects of this disclosure.

FIG. 1B illustrates examples of acoustic signals transmitted into a battery cell and response signals thereof, with one or more characteristics of the signals, according to aspects of this disclosure.

FIG. 1C illustrates an example of frequency domain characteristics of the signals of FIG. 1B, according to aspects of this disclosure.

DETAILED DESCRIPTION

Figure 2A:
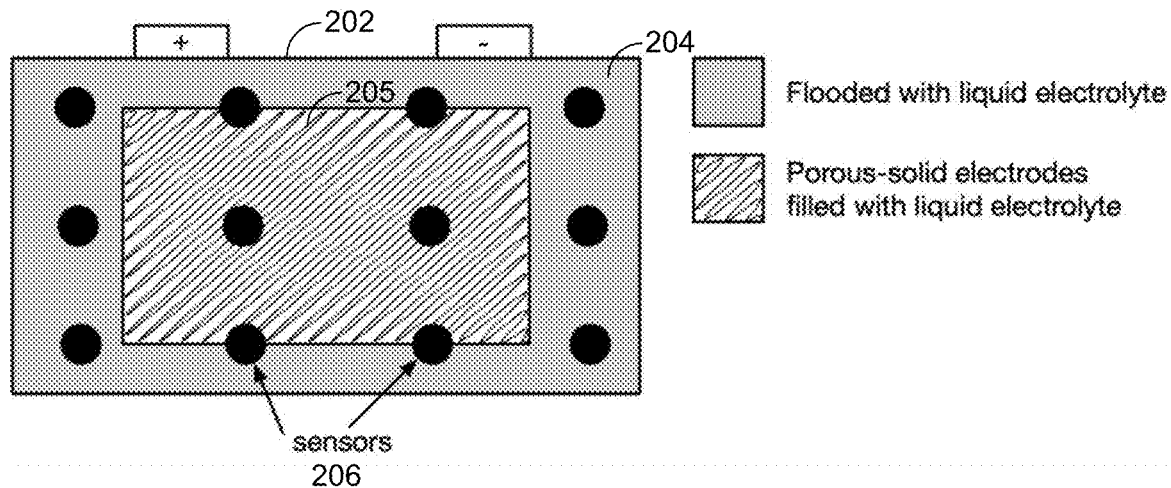
FIGS. 2A-B illustrate examples of sensor configurations across a battery cell area, and variations of acoustic features across the battery cell area, according to aspects of this disclosure.

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Aspects of this disclosure are directed to exemplary techniques for monitoring electrolyte wetting quality, which overcome the above-mentioned problems associated with conventional approaches. The disclosed techniques use acoustic or sound signals (e.g., ultrasound signals) to study aspects of electrolyte distribution in batteries in a fast, non-invasive, non-destructive, and scalable manner. For example, the disclosed techniques can be used in evaluating the quality, uniformity, and optimal wetting time of electrolyte distribution during commercial production. Measuring acoustic properties at multiple points across a battery cell's area and analyzing the change in acoustic signal features—both as a function of spatial position and soaking time—facilitates the evaluation of electrolyte wetting process and battery cell-level quality and uniformity in a fast, non-invasive manner. The information obtained using the example processes also can provide dynamic information that battery cell manufacturers can use to make process improvements, catch process drift, carry out smarter predictive maintenance, and screen out low quality battery cells much earlier than previously possible.

In some examples, one or more ultrasonic pulses are transmitted into a battery cell and response signals of the transmitted pulses are monitored. The response signals may include the waveforms generated due to transmission of the pulses through the battery cell and reflection (or echo signals) of the transmitted pulses, e.g., from walls of the battery cell. In some examples, means for transmitting acoustic pulses such as transducers (e.g., piezoelectric transducers) may be used for transmitting the pulses. A controller or ultrasonic pulser may provide electrical signals to the transmitting (Tx) transducers for transmitting acoustic signals of desirable amplitude, frequency, waveform, etc. Means for sensing or receiving responses to the transmitted pulses, such as receiving (Rx) transducers may be used for sensing or receiving the response signals. The Rx transducers may include suitable sensors, piezoelectric transducers, accelerometers, etc., for receiving the response signals and converting them to electrical signals. The controller may receive the electrical signals from the Rx transducers and store them in a database, for example, for further processing.

A processor in communication with the controller may be used for analyzing the transmitted and/or response signals to determine information regarding various physical conditions of the battery cell. For instance, the processor may analyze the transmitted and/or response signals in the time domain and/or the frequency domain to extract acoustic signal features such as a first-break time, centroid (mean) frequency, time-of-flight (ToF), amplitude, etc. By placing the Tx transducers at different locations on a battery cell and/or by sensing, using Rx transducers at different locations of the battery cell, the acoustic signal features may be studied at various locations. Based on a spread of the acoustic signal features, information pertaining to the electrolyte distribution may be obtained.

To explain, the acoustic signals are sensitive to changes in physical properties of the battery cell along the acoustic signals' path. In some examples, transmission of acoustic signals through solids is different from transmission of acoustic signals through liquids under similar conditions. For instance, under similar operating conditions such as a same travel distance for the acoustic signals, liquids tend to attenuate (or absorb) higher frequency sound waves as compared to monolithic solids. Whereas dry and partially saturated porous solids are both highly attenuative of the high frequency sound waves, porous solids that are filled with liquid electrolyte (e.g., in the case of an ideal battery cell electrode) are seen to be less attenuative of the high frequency sound waves. In other words, the porous solids that are filled with liquid electrolyte are observed to transmit a greater amount of high-frequency signals in comparison to dry or partially saturated porous solids. Accordingly, acoustic signal features (e.g., centroid frequency) are observed to vary for liquids, dry porous solids, partially saturated porous solids, fully saturated porous solids, and monolithic solids. Studying these variations across battery cells or across the body of a battery cell may reveal information pertaining to the underlying composition of the battery cells. For example, the variations in acoustic signal features can reveal information such as whether certain locations have solids, liquids, dry spots, etc.

Given the sensitivity of the acoustic signals to physical properties of the medium through which they travel, the example acoustic signal based analysis techniques discussed herein provide a highly accurate view of the battery cell's composition. In some examples, the view of the battery cell's composition reveals useful information regarding electrolyte wetting and distribution. In some examples, the Tx and/or Rx transducers may comprise piezoelectric transducers which are very sensitive and time-efficient (e.g., each reading by an Rx transducer may be accomplished in less than 1 ms, for detecting physical dynamics of the battery cell based on the acoustic signals, with high accuracy and in real-time). Therefore, the exemplary techniques may be used to probe a battery cell in controlled laboratory settings as well as at a commercial scale. These techniques may also be used to study physical differences in a test battery cell (e.g., compared to one or more reference batteries). In some examples, the test battery cell may be subjected to the electrolyte fill and soaking steps. In some examples, the test battery cell may be in one of the subsequent battery cell finishing process steps in the production of the test battery cell.

In example aspects, the acoustic signal based analysis of a battery cell may be performed on any battery cell during any stage of electrolyte fill and soaking, regardless of the specific chemistry and/or geometry of the battery cell. As discussed herein, the terms "battery cell", "battery", and "cell" may be used interchangeably, and may generally refer to any electrochemical energy storage system, and more specifically, electrochemical energy storage systems comprising electrolytes.

FIG. 1A shows an example apparatus 100 for analyzing a battery cell 102 using acoustic signals according to this disclosure. The apparatus may include one or more transmitting (Tx) transducers 104 or other means for sending sound signals into the battery cell (e.g., for transmitting a pulse or pulses of ultrasonic or other acoustic waves or vibrations through the battery cell). The apparatus further includes one or more receiving (Rx) transducers 106 or other means for receiving/sensing the sound signals, which can receive response signals generated from sound signals transmitted by the Tx transducers 104. The transmitted signals from a Tx transducer 104, from the side of the battery cell 102 on which the Tx transducer 104 is located may be referred to as pulse signals and reflected signals, e.g., from another side of the battery cell 102 may be referred to as echo signals. It is understood that references to response signals may include both the pulse and the echo signals. Further, one or more of the Tx transducers 104 may also be configured to receive response signals, and similarly, one or more of the Rx transducers 106 may also be configured to transmit acoustic signals. Therefore, even though separately illustrated as Tx and Rx, the functionalities of these transducers may be for both sending and receiving acoustic signals. In some examples, one or more of the Tx transducers 104 and one or more of the Rx transducers 106 may be situated on the same side, or oriented in a manner such that the pulse signals transmitted from a Tx transducer 104 may be received by an Rx transducer 106, where the pulse acoustic signals do not necessarily travel in a straight line to be received by the Rx transducer 106. Transmitting and receiving acoustic signals in such orientations may also be referred to as pitch-catch, and the apparatus 100 can also be configured to support the pitch-catch orientation in some examples.

The ultrasonic pulser/receiver 108 shown in FIG. 1A coupled to the Tx and Rx transducers 104, 106 may include a controller (not separately illustrated) for adjusting the amplitude, frequency, and/or other signal features of the transmitted signals. The ultrasonic pulser/receiver 108 may also receive the signals from the Rx transducers 106. The processor 110 in communication with the ultrasonic pulser/receiver 108 may be configured to store and analyze the response signal waveforms according to this disclosure.

Although not explicitly shown in FIG. 1A, more than one Tx transducer and/or more than one Rx transducer can be placed in one or more spatial locations across the battery cell. This allows studying a spatial variation of acoustic signal features across the battery cell 102. For instance, by placing two or more of the Tx transducers 104 at two or more locations across the battery cell 102, acoustic signals may be transmitted at two or more locations on the battery cell 102. Two or more of the Rx transducers 106 may be placed at two or more locations across the battery cell 102 to collect response signals based on the acoustic signals transmitted from one or more of the Tx transducers 104. By using the same arrangement of the one or more Tx transducers 104 and the one or more Rx transducers 106 to study acoustic signal features across different battery cells, e.g., a test battery cell and a reference battery cell, a respective test data set comprising the acoustic signal features of the test battery cell and a reference data set comprising the acoustic signal features of the reference battery cell may be collected. Appropriate comparisons may be made between the test data set and the reference data set to correlate any variations between the two data sets to physical properties of the battery cells.

In some examples, the test battery cell and the reference battery cell may be the same battery cell at different stages of production. For instance, the reference battery cell may have a certain level of electrolyte fill, while the test battery cell may have a greater or lower level of electrolyte fill. In some examples, the reference battery cell may be at a certain production stage, while the test battery cell may be at an earlier or later production stage.

Furthermore, the placement and type of the Tx and/or Rx transducers 104, 106 used can be customized based on the type of analysis, size, shape, and geometry of the battery cell 102, and/or any other factor. In some examples, the Tx and/or Rx transducers 104, 106 can be single element transducers distributed in any regular linear or two-dimensional shape. In some examples, the Tx and/or Rx transducers 104, 106 can be single element transducers distributed in an array. In some examples, the Tx and/or Rx transducers 104, 106 can be multi-element arrays distributed in a linear array or a two-dimensional matrix. In some examples, the Tx and/or Rx transducers 104, 106 can be phased array transducers. In the various above-described examples, the Tx and/or Rx transducers 104, 106 may be placed by any suitable means (e.g., actuators, mechanical arms, screws, adhesives, etc.) to be in contact with a surface of the battery cell 102. Alternatively, the Tx and/or Rx transducers 104, 106 may be placed in proximity to the battery cell 102 in a manner which allows them to send and/or receive the acoustic signals into/from the battery cell 102, respectively.

FIG. 1B shows an example of an acoustic signal which may be transmitted by a Tx transducer 104. The Tx signal 114 is shown as a single pulse according to one example wherein the Tx transducer 104 transmits the acoustic pulse (e.g., an ultrasonic pulse) into the battery cell 102. The Rx signal 116 is the response signal generated by the transmission of the Tx signal 114, shown in this example to be a sinusoidal wave. The Rx signal 116 may be received by one or more of the Rx transducers 106.

In some examples, one or more features of the Tx signal 114 and/or the Rx signal 116 may be studied. These features may be in the time domain and/or the frequency domain. For example, a time-of-flight (ToF) of a signal, which refers to the time taken for a signal or portion thereof to travel through the battery cell 102 or a portion thereof. For example, the ToF of the Tx signal 114 refers to the time lapsed from the time instance (ToF=0) at which the Tx signal 114 was transmitted into the battery cell 102, and the time instance for any portion of the Rx signal 116 to be received by an Rx transducer 106. The first break time is another signal feature corresponding to the break time of the first harmonic of the response Rx signal 116. Similarly, a first peak of the Rx signal 116 may be another signal feature. The amplitude of the Tx signal 114 and/or the amplitude of the Rx signal 116 may constitute other signal features which may be studied.

FIG. 1C shows a frequency domain waveform 118, which may be obtained by performing a transformation such as a fast Fourier transform (FFT) on the time domain Rx signal 116. The waveform 118 provides an indication of the distribution of the frequencies contained in the Rx signal 116.

The frequencies in the Rx signal 116 may have a range, from relatively low to relatively high frequencies. Statistical analysis of the waveform 118 can reveal the distribution of the frequency content. For example, signal features such as a centroid (or mean) frequency, frequency standard deviation, etc., may be derived from the waveform 118. These signal features may provide an indication of the distribution of the frequency content in the Rx signal 116. For example, if the Rx signal 116 contains a large amount of low frequencies, then the centroid frequency obtained from the waveform 118 may be relatively low. Conversely, if the frequency content of the Rx signal 116 is biased towards higher frequencies, then the centroid frequency obtained from the waveform 118 may be relatively high.

As previously explained, liquids may attenuate higher frequencies of an acoustic Tx signal 114 passing through, which means that the resultant Rx signal 116 may have more low frequency content for response signals obtained from areas of the battery cell 102 which have liquid content. Thus, the centroid frequency obtained from the waveform 118 for the liquid portions will be relatively low. Conversely, porous solids may transmit the higher frequencies of the acoustic Tx signal 114 passing through, which means that the resultant Rx signal 116 may have more high frequency content for response signals obtained from porous areas of the battery cell 102 which are saturated with liquid electrolyte. Thus, the centroid frequency obtained from the waveform 118 for the porous solid portions will be relatively high. In some example aspects, a spatial distribution of the centroid frequencies for signals obtained from various locations of a battery cell may be obtained, based on which, inferences may be made as to the composition (liquid, solid, level of saturation, etc.) of the regions of the battery cell 102 through which the acoustic signals may have traveled.

FIG. 2A shows an example composition of a battery cell 202. For the purposes of illustration of example aspects, the battery cell 202 may be a pouch battery cell, with one or more Tx transducers configured to transmit acoustic signals into the battery cell 202 and one or more Rx transducers configured to receive response signals. In some examples, one or more transducers can be used to cause acoustic signals to travel through at least one or more portions of the battery cell 202, including one or more of acoustic signals (e.g., pulses) transmitted into the battery cell 202 and reflections (or echos) of the acoustic signals transmitted into the battery cell 202. The responses to the acoustic signals can include responses to the acoustic transmitted into the battery cell 202, or responses to the reflections of the acoustic signals transmitted into the battery cell 202.

In the example shown, the sensors 206 may be Rx transducers placed in a 2D array across at least the illustrated surface of the battery cell 202. While not specifically shown in this view, Tx transducers may also be placed on the same surface (for the sensors 206 to sense reflected or echo signals, for example), or a different surface (e.g., opposite surface, for the sensors to sense transmitted signals). In some cases, one or more of the sensors 206 may also include the functionality for transmitting the acoustic signals into the battery cell 202, as well as sensing the response signals. In some examples, the transmitted and reflected signals may be studied separately, while in some examples, a combination of transmission and reflection mode measurements can be used. For example, a combination of transmission and reflection mode measurements can be used to determine the location of a void. For example, the void can be in relation to the area of the battery cell or in relation to a thickness of the battery cell (e.g., between certain layers).

As shown in FIG. 2A, the composition of the battery cell 202 may vary across the battery cell 202. For example, the schematic view shows that an outer portion 204 may be flooded with liquid electrolyte and an inner portion 205 may contain a porous-solid section filled with or saturated with liquid electrolyte. As one of ordinary skill will understand, the variation in the composition of the battery cell 202 across its body may be more complex and may be less or more homogenous than the depicted example By studying responses to acoustic signals transmitted through the battery cell 202 (or portions thereof) and extracting acoustic signal features from the responses, it is possible to obtain information about the composition of the battery cell 202.

Figure 2B:
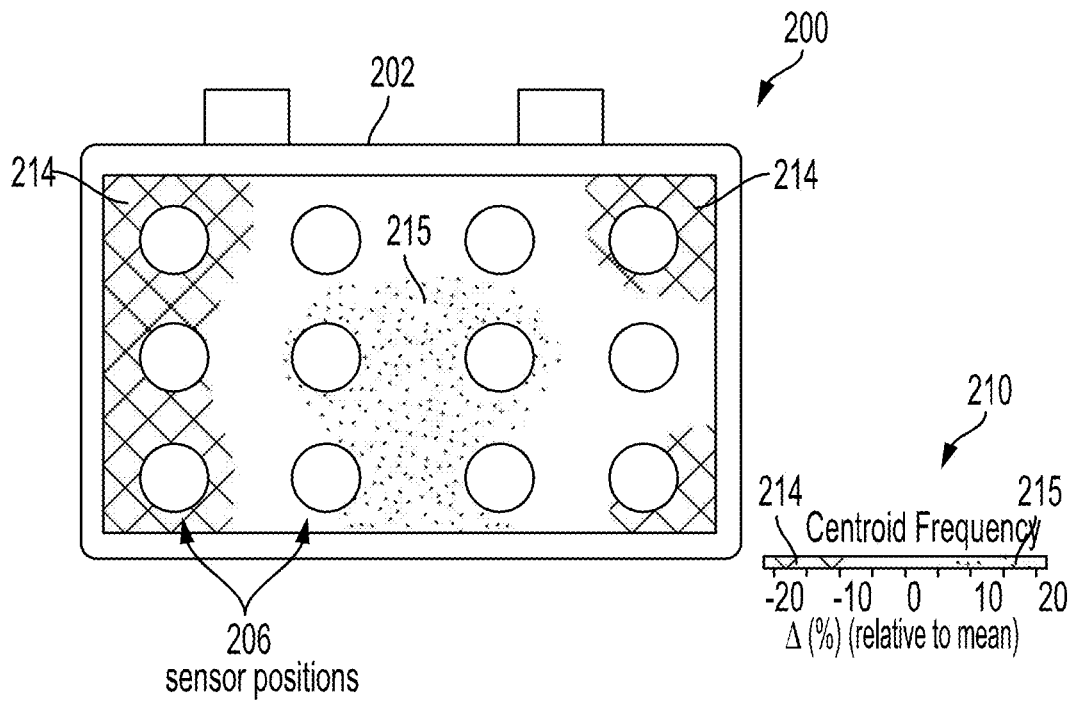

FIG. 2B shows an example view of a spatial distribution 200 of acoustic features of the battery cell 202 of FIG. 2A, for example. In the depicted example, the acoustic features comprising centroid frequencies of the response signals collected from sensors, such as the sensors 206 is mapped. In more detail, the sensors 206 may collect response signals (e.g., as shown in FIG. 1B) which are responsive to the acoustic signals transmitted into the battery cell 202. A transformation such as an FFT on the response signals may provide the frequency responses (e.g., as shown in FIG. 1C) for the response signals, from which the acoustic features such as centroid frequency may be derived.

Although the sensors 206 are shown at specific locations on the surface of the battery cell 202, these sensors may be moved or additional sensors may be utilized to collect the acoustic features at numerous locations on the surface of the battery cell 202. In some cases, the acoustic features for certain locations may also be interpolated based on the acoustic features obtained from sensors in other locations (e.g., neighboring locations). A "spatially resolved map" may be created with the acoustic features plotted to cover numerous locations across one or more surfaces (e.g., the entire surface or portions thereof) of the battery cell 202. Various visualization schemes may be employed for observing the distribution of the acoustic features across the one or more surfaces of the battery cell 202.

In FIG. 2B, the spatial distribution 200 is depicted with different schemes or shadings in grayscale to correspond to different centroid frequencies. As seen from the scale 210, the centroid frequencies for the response signals may be in a range from low (214) to high (215) centroid frequencies. The areas marked with corresponding reference numerals on the spatial distribution 200 depict corresponding low centroid frequency area 214 (illustrated with crosshatches) and high centroid frequency area 215 (illustrated with dots) according to the example shown.

In some examples, the visualization schemes provide a means for determining the underlying composition of the battery cell 202 in a non-destructive manner. For instance, in the low centroid frequency area 214, the composition of the battery cell 202 may be estimated to contain portions filled predominantly with liquid electrolyte, such as the portion 204 shown in FIG. 2A. Similarly, in the high centroid frequency area 215, the composition of the battery cell 202 may be estimated to contain porous solid electrodes filled with liquid electrolyte, such as the portion 205 shown in FIG. 2A.

Figure 3A:
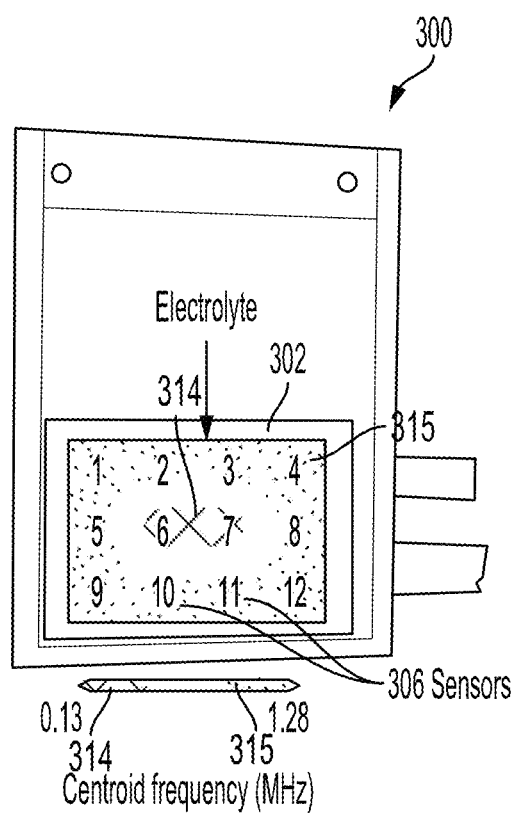
FIG. 3A illustrates an example battery cell with sensors placed across its area, and an indication of liquid electrolyte injected into the battery cell, according to aspects of this disclosure.
Figure 3B:
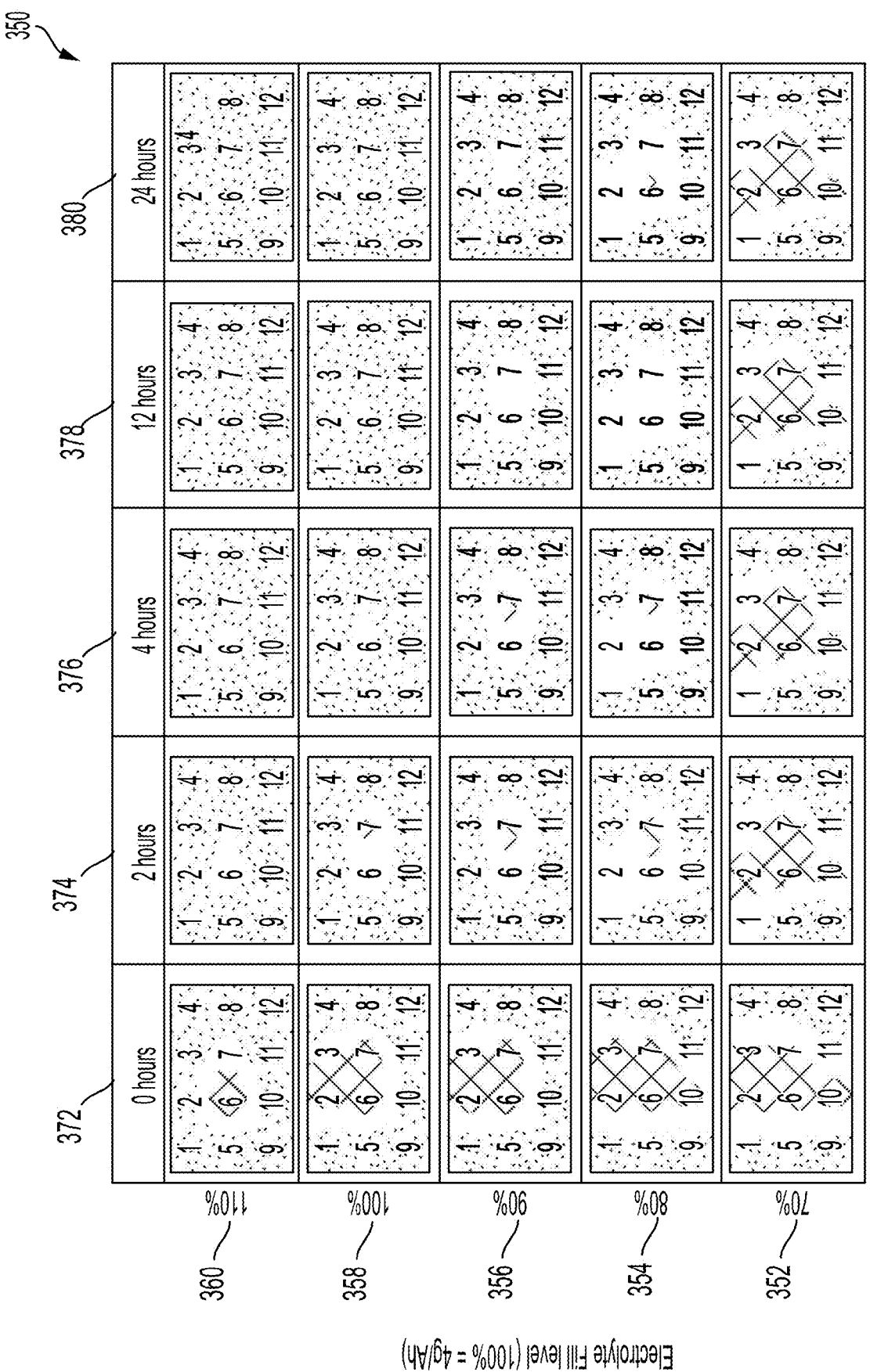
FIG. 3B illustrates a matrix of spatial distributions of acoustic features for battery cells with different electrolyte compositions and different soaking times, according to aspects of this disclosure.

FIGS. 3A-B illustrate examples of using spatially resolved maps, such as those shown in FIG. 2B, at different process steps and/or different levels of electrolyte fill. In some examples, FIGS. 3A-B provide techniques for inspection, monitoring, visualizing, and/or tracking the progression of electrolyte wetting during the fill and soaking steps, as well as during the formation and post-formation steps of a battery cell.

FIG. 3A illustrates a setup 300 with at least a portion of a battery cell 302 (e.g., a pouch cell) depicted for inspection. Sensors 306 (numbered 1-12) are placed across the portion of the battery cell 302 for monitoring. Acoustic measurements can be obtained using the sensors 306 when the battery cell 302 is a dry cell, prior to electrolyte being injected. Subsequently, liquid electrolyte may be injected into the battery cell 302, and at any time instance, a spatial distribution of the acoustic features of the battery cell 302 may be derived. The spatial distribution can be mapped to the time instances, e.g., with an initial time corresponding to the dry cell prior to liquid electrolyte injection, and subsequent time instances following the electrolyte injection. For example, the centroid frequency may be plotted across the battery cell 302 as described with reference to FIGS. 2A-B above. Once again, variations in the centroid frequency may be depicted with different visualization schemes, such as colors, shadings, etc. Based on the centroid frequency at a particular location, the underlying composition of the battery cell 302 corresponding to that location may be estimated. From the spatial distribution of the centroid frequency, portions of the battery cell with relatively high and relatively low electrode distribution may be identified.

For example, sound or acoustic signals do not effectively travel through gas or vacuum, when compared to the acoustic signal transmission through liquids or solids. Thus, a porous solid portion filled with the liquid electrolyte may transmit high frequency acoustic signals, resulting in the high centroid frequency area 315 (illustrated with dots). The portions of the battery cell 302 which have void spaces (e.g., pockets of gas or vacuum) may not transmit the acoustic signals effectively. Thus, in FIG. 3A, the dry or "unwetted" portions of the battery cell 302 may have lower centroid frequencies, as shown in the low centroid frequency area 314 (illustrated with crosshatches).

FIG. 3B shows a matrix 350 of spatial maps for one or more battery cells. Each row of the matrix 350 corresponds to a particular electrolyte fill level for a battery cell. Illustration schemes similar to those described with reference to FIG. 3A have been employed for the elements shown in the matrix 350. Each of these elements illustrate a spatial distribution of acoustic features, which may indicate high frequency areas with good electrolyte distribution and low frequency areas with poorer electrolyte distribution (e.g., dry or unwetted areas).

More specifically, the spatial distributions of acoustic features (or spatial maps) for battery cells with 70%-110% fill levels have been shown in the rows 352-360, respectively, of matrix 350 in one illustrative example. For each of these rows, the columns 372-380 contain spatial maps at different process steps. The process steps may indicate soaking or wetting time (time after injection) of liquid electrolyte within the battery cell. For example, considering a battery cell with 70% electrolyte fill in row 352 of the matrix 350, the spatial map of the battery cell at 0, 2, 4, 12, and 24 hours of wetting time have been shown in the corresponding columns 372-380. Similar rows 354-360 have been shown for battery cells in successive rows above the bottom row, with 80%, 90%, 100% and 110%, respectively, at 0, 2, 4, 12, and 24 hours of wetting times at columns 372-380.

From the matrix 350, the battery cell composition may be obtained for a particular battery cell at a wetting time of interest. For example, by studying the acoustic features of the battery cell with 70% electrolyte fill in row 352 at the different soaking times in columns 372-380, the changes in the underlying composition of the battery cell at the different soaking times may be visualized. Based on the distribution of the centroid frequencies across the battery cell's surface area, the distribution of the electrolyte at the various soaking times may be estimated. Any white spaces or voids in the spatial maps may indicate corresponding dry or unwetted portions. From the matrix 350, ideal soaking times can be estimated.

For example, for the battery cell with 110% electrolyte fill in row 360, the illustration of the spatial map between 2 hours and 4 hours at columns 374 and 376, respectively, does not reveal a significant difference, which may be taken as an indication that the electrolyte distribution does not vary significantly from 2 to 4 hours of soaking time. Accordingly, a soaking time of 4 hours or less may be considered to be sufficient for this battery cell. In another example, considering the battery cell with 70% electrolyte fill in row 352, dry spots may be detected even after 24 hours of soaking time in column 380, and a decision may be made accordingly to allow longer soaking times for the battery cell's finishing steps to be completed. As will be appreciated, these examples are merely for the sake of explanation and the specific distribution and soaking times discussed in such examples are not to be construed as any inherent limitations to the disclosed aspects.

In some examples, the matrix 350 may provide analytical tools for battery manufacturers to determine the degree of uniformity or homogeneity of liquid electrolyte within a battery cell at various stages of development, from product and process design, to prototyping and process development environments, to pilot or volume production lines. In some examples, the acoustic signal analyses to obtain the matrix 350 may be conducted using continuous in-line measurements or monitoring, or with one or more periodic snapshots during the electrolyte fill and soaking process, using the sensors 306, for example. The analysis may be performed by the use of one or more computers and/or using any suitable combination of hardware and software.

In some examples, an aggregate or reduced-dimension acoustic metric or acoustic score may be derived from the 2D spatial distributions of acoustic features. For example, dimensionality reduction techniques may be applied to the 2D spatial distributions 200 of FIG. 2B, the matrix 350 of FIG. 3B, etc., to obtain a reduced dimension metric, e.g., a single dimension value referred to as a score. The score may be used in addition to or as an alternative to the 2D spatial distribution for determining electrolyte distribution, soaking time, etc.

Figure 4A:
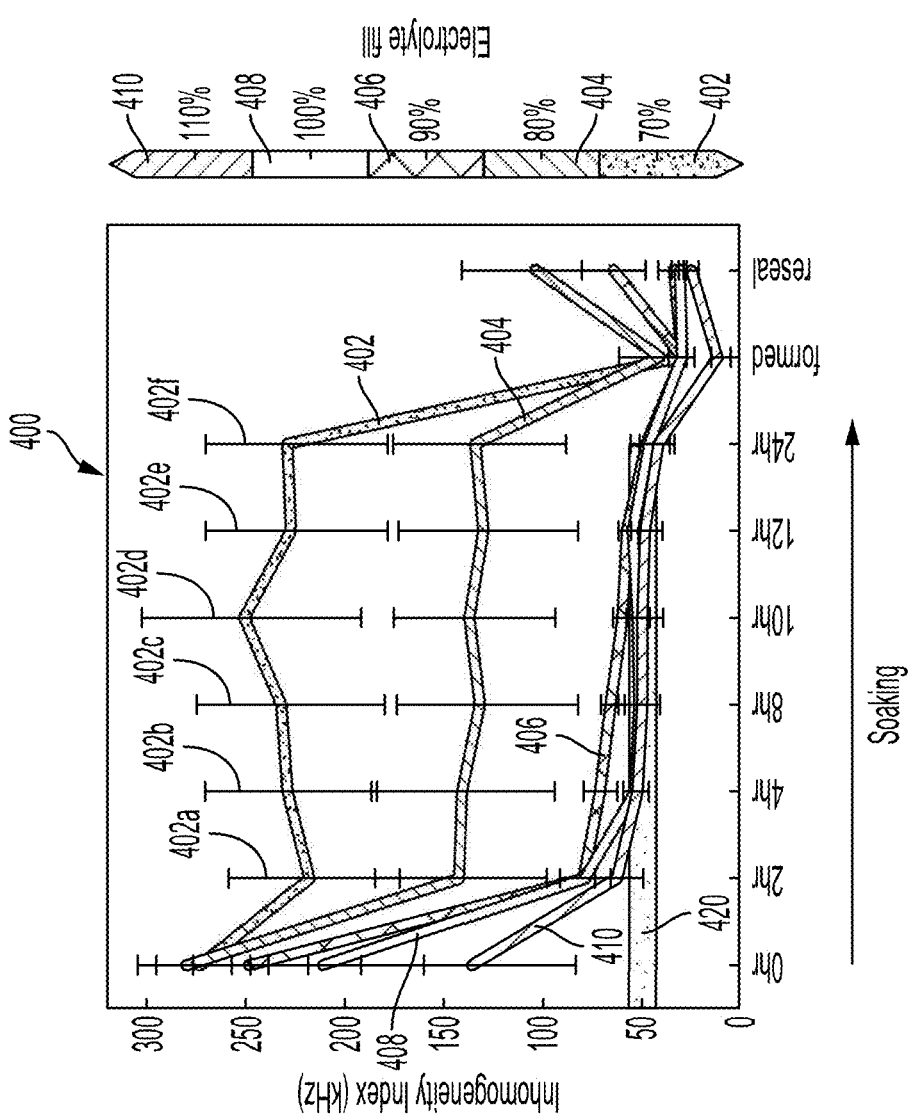
FIG. 4A illustrates acoustic features represented as a reduced dimension score, according to aspects of this disclosure.

FIG. 4A illustrates a graph 400 containing reduced dimension scores. In the example shown, the range of centroid frequency values, e.g., on the scale 210 of FIG. 2B or across the various elements of the matrix 350 in FIG. 3B is reduced or converted to a number referred to as an "inhomogeneity index." The inhomogeneity index may be calculated as a function of distribution of the acoustic features such as the centroid frequency. The function may be based on the centroid frequencies considered individually or in combination across all locations on the battery cell 202/302 which are monitored using the sensors 206/306, for example In some implementations, a homogeneity index or acoustic score can be used as an alternative to the inhomogeneity index. The homogeneity index can include a measure of uniformity of distribution of electrolyte across the battery cell. In some examples, the homogeneity index or acoustic score can be standardized as a metric across battery chemistries and sizes.

In the graph 400 of FIG. 4A, the inhomogeneity index is shown on the vertical axis (y-axis). The function used to determine the inhomogeneity index may be, for example, a standard deviation (std.) or interquartile range (iqr.) of the distribution of acoustic features such as the centroid frequency. In the illustrated example, the centroid frequencies may be measured at the 12 locations of the sensors 206/306 placed across the surface of the battery cell 202/302, for example. The measurements of the acoustic features may be taken at the different soaking times shown in the matrix 350, in some examples. In some examples, the measurements of the acoustic features may be made at certain manufacturing steps, and averaged across battery cells at various electrolyte fill levels. For example, at a certain soaking time corresponding to a column of the matrix 350 or a certain manufacturing step, the acoustic features for the battery cells of the various electrolyte fill levels (rows of the matrix 350) may be measured. In an example, the acoustic features measured may be averaged across multiple battery cells (e.g., 8 battery cells) at each electrolyte fill level shown. The inhomogeneity index is plotted for five battery cells 402-410, each having a different electrolyte fill level as shown. Correspondingly, five plots 402-410 are shown, illustrating the variation in the inhomogeneity index over soaking times.

In the graph 400, a time scale is depicted in the horizontal axis (x-axis). The different times shown in the graph 400 may correspond to different stages of battery cell finishing during manufacture. In the example shown, a first stage corresponds to an electrolyte fill stage wherein electrolyte is filled into the battery cell. In some implementations, electrolyte injection into the battery cell may be preceded by pulling vacuum on the cell. In some examples, a fill stage can have multiple such electrolyte injection and vacuum steps. The electrolyte fill stage may correspond to the "0 hr" shown on the x-axis. The acoustic features are shown for the electrolyte fill stage on the y-axis in the form of the inhomogeneity index in plots 402-410.

A second stage corresponds to an electrolyte soaking stage wherein the electrolyte is allowed to distribute and soak the battery cell layers. The electrolyte soaking stage may span from "0 hr" to "24 hr" on the x-axis, also referred to as soaking times. The acoustic features for the electrolyte soaking stage are shown on the y-axis in the form of the inhomogeneity index in plots 402-410.

A third stage corresponds to battery cell formation, wherein the battery cells are cycled at low rates for solid electrolyte interphase (SEI) layer formation. The battery cell formation stage is indicated as "formed" on the x-axis. During the formation stage, e.g., for Lithium Ion battery cells, gas is generated as the solvents or electrolyte breakdown. With gas generation, the mean value of the acoustic feature (such as centroid frequency or rms amplitude) drops, as does the Inhomogeneity Index. The acoustic features for the battery cell formation stage are also shown on the y-axis in the form of the inhomogeneity index in plots 402-410.

A fourth stage corresponds to a degassing and resealing stage (which may be applicable specifically for pouch cells). In this stage, the gas formed during the formation stage is removed and the battery cell is resealed. For degassing, a vacuum pulling process may be used to remove excess gas generated in the formation stage. Following the degassing, resealing is performed, e.g., for the pouch cells. The degassing and resealing stage is indicated as "reseal" on the x-axis. The electrolyte tends to redistribute itself during degassing and resealing, and correspondingly, the inhomogeneity index is seen to rise slightly, at the "reseal" time point on the x-axis.

For each inhomogeneity index plot 402-410, error bars are shown at the different soaking times. For example, error bars 402a-f have been specifically identified for the inhomogeneity index plot 402. Similar error bars are shown for the other plots 404-410 even if not specifically identified with reference numerals. These error bars reflect the maximum and minimum values for the inhomogeneity index obtained from acoustic features for the battery cells in the group (e.g., the 8 battery cells mentioned above) which were averaged to obtain the inhomogeneity index of the plot 402 at each soaking time. The error bars provide useful information about the possible variations or deviation from the average inhomogeneity index at each soaking time.

The inhomogeneity index can be similarly calculated for other acoustic features (e.g. rms amplitude, first-break time, first peak, frequency standard deviation, etc.). In some examples, the inhomogeneity index can be a function of other aspects (other than the std. and iqr. noted above) of the distribution of acoustic features across different locations of the battery cell.

In general, the higher a battery cell's inhomogeneity index, the less homogenous the battery cell is. For example, in the case of electrolyte distribution a low inhomogeneity index may mean that the battery cell is more homogenous, reflecting a uniform distribution of the electrolyte in the battery cell. Thus, at the start of an electrolyte fill process, during the electrolyte fill stage, the inhomogeneity index may be high, and as soaking time increases during the soaking stage, the inhomogeneity index decreases. When the battery cell is formed, the inhomogeneity index is seen to dip as noted above, while during the subsequent resealing and degassing stage, the inhomogeneity index may rise.

In some examples, a threshold value may be provided to determine when the battery cell's inhomogeneity index has reached a sufficiently low value. The threshold value may be used for analyzing the battery cell during the electrolyte soaking stage in some examples. In some examples, separate/different threshold values may be used for subsequent formation, degassing, and reseal stages.

For example, FIG. 4A illustrates a threshold bar 420, which represents a threshold value for the soaking stage. During the soaking stage, if the inhomogeneity index in plots 402-410 falls below the threshold bar 420, the respective battery cell is considered to be uniformly wetted by electrolyte. The threshold value can be estimated for battery cells based on when the score asymptotes to a stable value, or can be determined based on a reference dataset (comprising previously collected spatially resolved acoustic signals and derived features and metrics of similar battery cells).

Figure 4B:
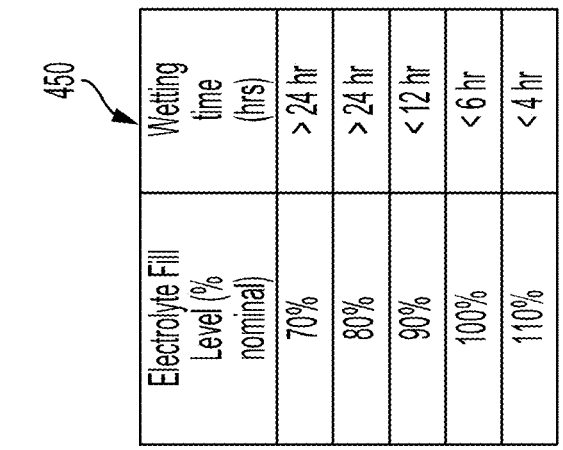
FIG. 4B shows ideal wetting times for battery cells with different electrolyte compositions, according to aspects of this disclosure.

FIG. 4B illustrates a table 450 containing example inferences for ideal wetting times or soaking times for different battery cells using the graph 400. These inferences may be similar to the inferences drawn from the matrix 350, as discussed above, but based on a different visualization scheme (i.e., the reduced dimension inhomogeneity index in the graph 400 vs. the 2D spatial maps of the matrix 350). For example, from the graph 400, the inhomogeneity index plot 402 for the battery cells with 70% electrolyte fill is seen to display variation beyond 24 hours of soaking time, which may lead to the inference that more than 24 hours of soaking time may be needed for battery cells with 70% electrolyte fill. In another example, from the graph 400, the inhomogeneity index plot 410 for the battery cells with 110% electrolyte fill is seen to display minimal variation between 2 and 4 hours of soaking time, which may lead to the inference that less than 4 hours of soaking time may be sufficient for battery cells with 110% electrolyte fill. As will be appreciated, these conclusions are similar to those drawn from the matrix 350 for similar battery cells. Therefore, any visualization scheme or combination thereof may be used for inferring or estimating process steps such as soaking times for battery cells.

In some examples, the information from the matrix 350 and/or the graph 400/table 450 may be useful for process developers, e.g., to quickly and efficiently optimize soaking time for each type of battery cell (e.g., battery cells with different electrolyte fills, shapes, geometry, chemistry, electrochemical properties, etc.). This information can also help production engineers, for example, to inspect the wetting completion of each battery cell in-line, improve the average throughput of the soaking step, and more easily identify and address process drifts, if any.

From the above information, process conditions that utilize insufficient amounts of electrolyte may be identified in some examples. Insufficient electrolyte amounts may affect all downstream process steps, and as such it is important to identify these types of defects or quality deviations as early in the battery cell production process as possible. Additionally, identification of such defects provides a pathway for building statistical models that correlate the distribution of acoustic properties across the battery cell with ultimate performance characteristics.

In some examples, the acoustic feature information from the 2D maps of the matrix 350 and/or the reduced-dimension scores from the graph 400/table 450 can also be used for making decisions that inform follow-on actions during process development (e.g., adjustments to process parameters, soaking process, etc.) or during production (e.g. battery cell-specific soaking time, predictive maintenance, etc.)".

Using the acoustic feature information as above for inspection and analysis of a battery cell can also inform the optimization of solid electrolyte interphase (SEI) formation protocols during process development and to assess the quality of the SEI layer during high-volume production. As previously described, the SEI layer formation occurs when the battery cells are cycled (charged and discharged) at low rates. The uniform distribution of SEI layers across the electrode active area is very important for ensuring ideal or optimal battery cell performance But the SEI layer uniform distribution is highly dependent on the uniformity of electrolyte wetting. Hence, when inhomogeneity index of the battery cell is high at the end of soaking stage—indicating non-uniform wetting—the SEI layer formation is non-uniform. Thus, a patchy SEI layer (i.e., a low quality SEI layer) will have higher inhomogeneity index at the "formed" time point in FIG. 4A.

The acoustic feature information (e.g., from the 2D maps of the matrix 350 and/or the reduced-dimension scores from the graph 400/table 450) can also be used to eliminate or reduce the need for extensive battery cell aging, where the decay in each battery cell's open circuit voltage is monitored over time (i.e., a self-discharge rate of the battery cell).

Figure 5:
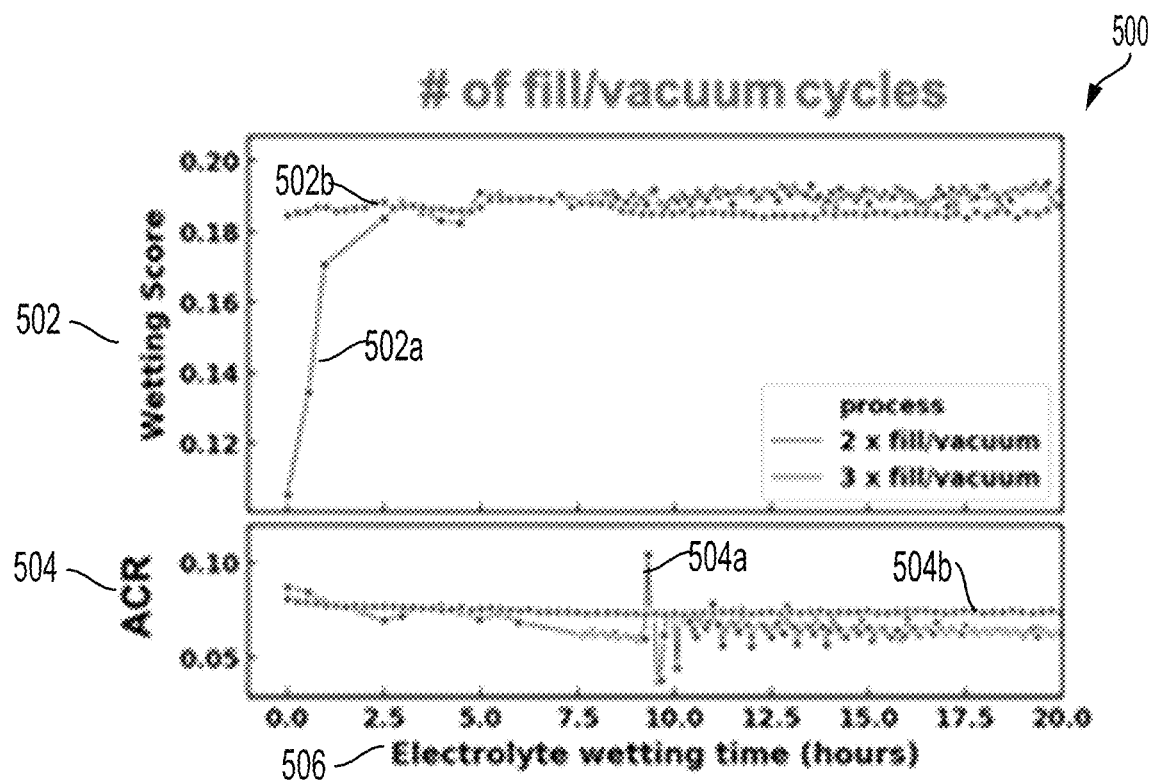
FIG. 5 illustrates a graph of acoustic features corresponding to fill/vacuum cycle based process variations, according to example aspects of this disclosure.

FIG. 5 illustrates a graph 500 according to an example electrolyte fill process. The graph 500 can assist in development and optimization of electrolyte fill processes for one or more battery cells. The graph 500 can be obtained by studying acoustic response characteristics for a plurality of battery cells (e.g., pouch cells) subjected to one or more fill and vacuum cycles. The fill and vacuum cycles refer to filling of the pouch cells with electrolyte and subsequent sealing under vacuum conditions. The fill and vacuum cycles can lead to repeatable quality and allow for safe opening of gas bubbles created during formation. For example, a plurality of identical dry pouch cells may be filled with the same amount of electrolyte, and subjected to multiple fill and vacuum cycles, with their acoustic response characteristics studied using the aforementioned techniques over a course of their wetting times.

In the graph 500, processes related to two (2×) fill/vacuum cycles and three (3×) fill/vacuum cycles are illustrated. An acoustic "wetting score" 502 on the y-axis provides a measure of the time-to-uniform-wetting of electrolyte, with a wetting time 506 identified in hours for electrolyte wetting time on the x-axis. The time-to-uniform wetting refers to the time taken for the wetting score to flatten out or reach an asymptote. For example, the wetting score 502a shows a plot of the time-to-uniform wetting for pouch cells subjected to the 2× fill/vacuum cycles, and the wetting score 502b shows a plot of the time-to-uniform wetting for the pouch cells subjected to 3× fill/vacuum cycles. As seen the wetting score 502b is considerably shorter for the 3× fill/vacuum cycles than the wetting score 502a for the 2× fill/vacuum cycles. Thus, the graph 500 can effectively indicate that subjecting the pouch cells to 3× fill/vacuum is likely to improve electrolyte wetting time and efficiency.

Also identified in the graph 500 is AC impedance (ACR) 504. The ACR 504 can be obtained by spectroscopy or studying acoustic responses to measure the resistance and capacitance properties of a battery, e.g., based on applying acoustic pulses such as sinusoidal AC excitation signals. The ACR 504a indicates a graph of the ACR studied over the course of the wetting time 506 for the battery cells subjected to the 2× fill/vacuum cycle and the ACR 504b indicates a graph of the ACR studied over the course of the wetting time 506 for the battery cells subjected to the 2× fill/vacuum cycle. In the illustrated example, studying the ACR 504a and ACR 504b is not seen to provide sufficient information to identify ideal wetting times for the battery cells subjected to the different fill/vacuum cycle process conditions. Thus, wetting score 502 is seen to provide a better indication of soaking times, in comparison to the ACR 504.

Figure 6:
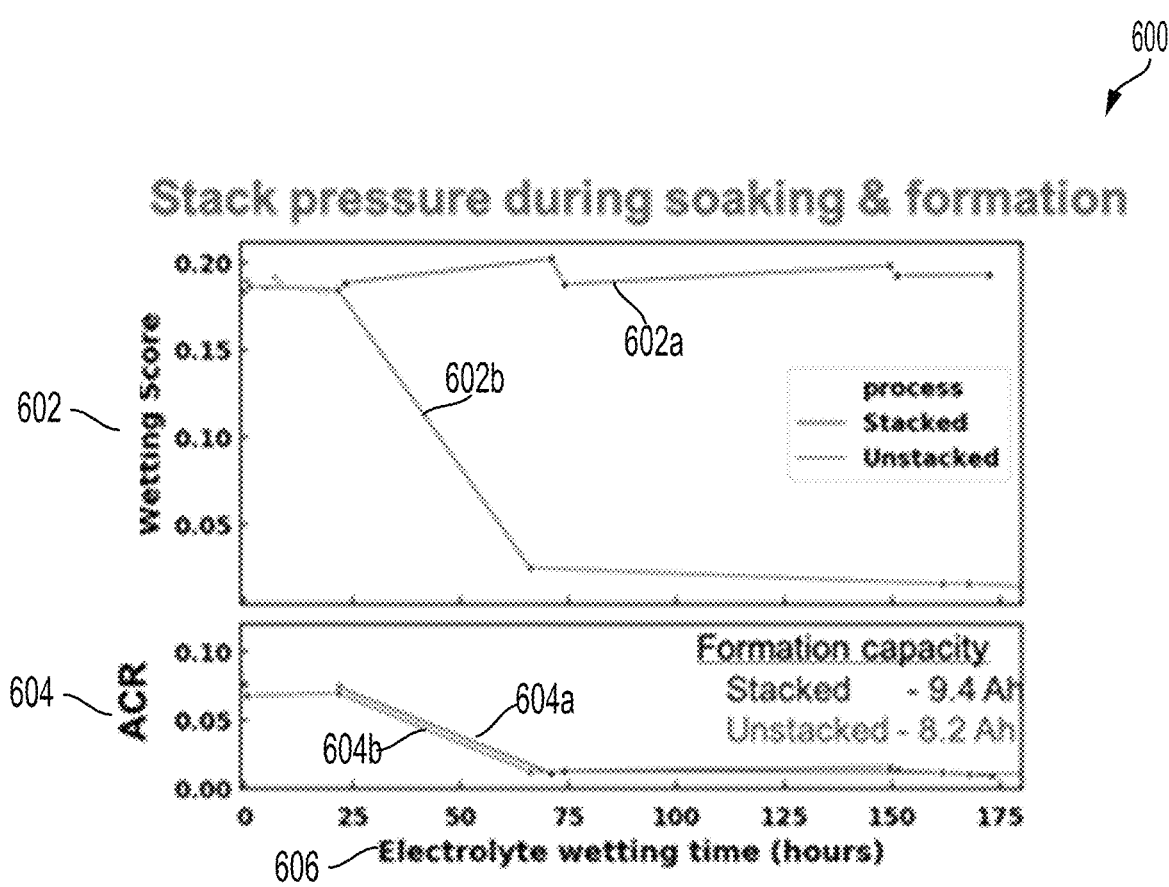
FIG. 6 illustrates a graph of acoustic features corresponding to stack pressure based process variations, according to example aspects of this disclosure.

FIG. 6 illustrates a graph 600 according to another example electrolyte fill process. The graph 600 can be used for development and optimization of electrolyte fill processes for one or more battery cells. The graph 600 can be obtained by studying acoustic response characteristics for a plurality of identical battery cells (e.g., pouch cells) filled with the same amount of electrolyte with an identical electrolyte fill process but with differing stack pressure amongst at least two of the plurality of the identical battery cells. The stack pressure refers to compressing of the pouch cells (e.g., between two pieces of acrylic with springs) during a period of soaking (e.g., 24 hours) and formation steps. For example, between two identical cells, stack pressure may be applied to one cell but not the other in obtaining the graph 600. The resulting difference in the two identical cells can be seen in the post-formation acoustic wetting scores 602 studied over a wetting time 606. For example, a wetting score 602a is shown for the cell with the stacked pressure (or stacked cell) and a wetting score 602b is shown for the cell without the stacked pressure (or unstacked cell). The difference between the wetting scores 602a and 602b illustrates significant differences in formation capacities between the two cells as illustrated.

FIG. 6 also illustrates ACR 604 studied over the wetting time 606 for the two cells. It is seen that AC impedance ACR 604a for the stacked cell is not significantly different from the ACR 604b for the unstacked cell. Thus, stacked pressure can provide another measure for identifying process conditions which can lead to better wetting scores/electrolyte wetting time and efficiency.

Figure 7:
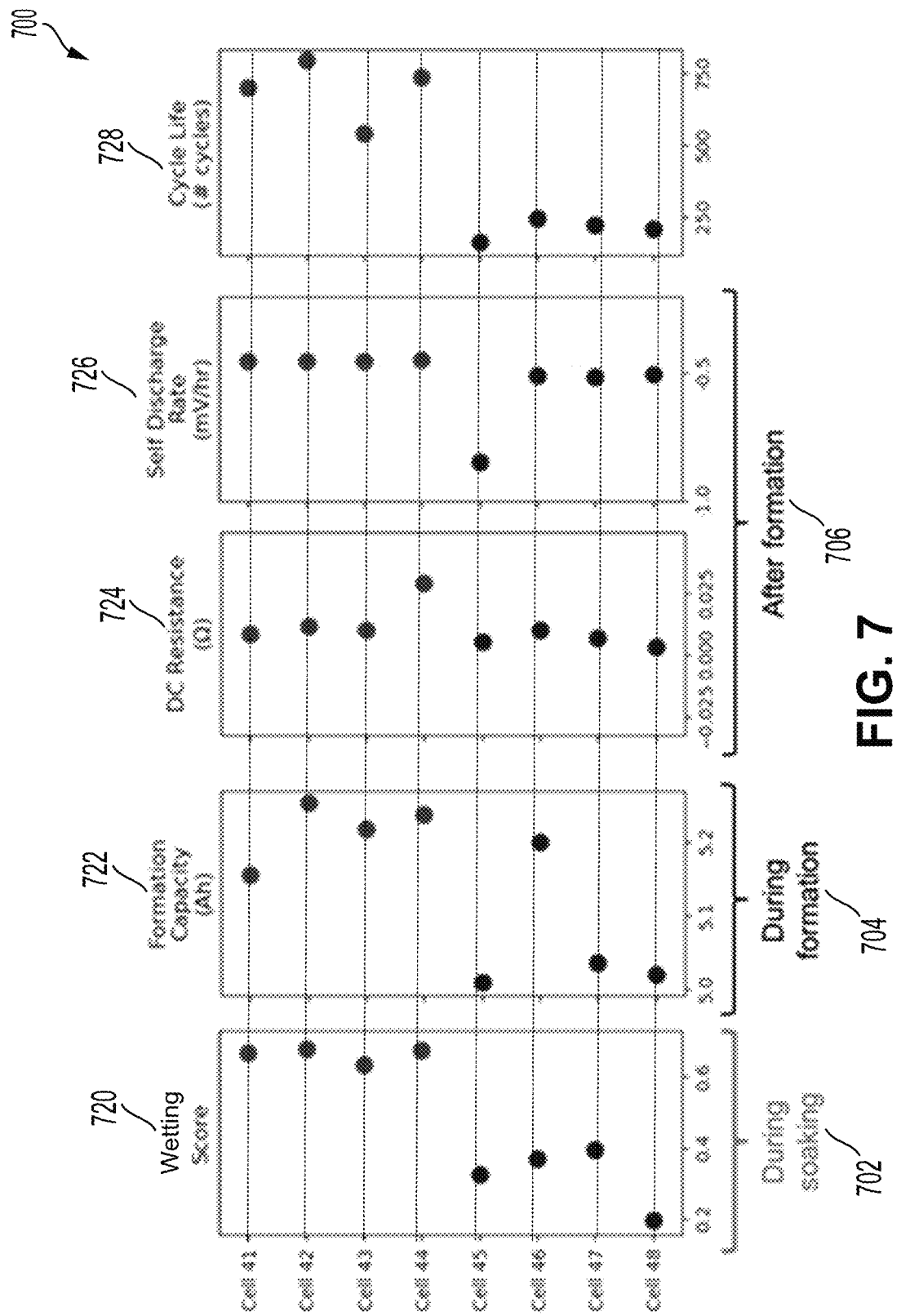
FIG. 7 illustrates a plot of acoustic features corresponding to variations in manufacturing conditions, according to example aspects of this disclosure.

FIG. 7 illustrates plot 700 illustrating variations 720-728 in manufacturing conditions based on acoustic inspection on battery cells during various stages of electrolyte wetting. A first batch of battery cells 41-44 are identified as examples of battery cells which are coated and stacked identically during a first time-period under consideration (e.g., on a particular day). A second batch of battery cells 45-48 are examples of battery cells which are assembled (e.g., into pouch packages) on a subsequent second time-period (e.g., on a following day). All battery cells 41-48 are subjected to acoustic testing using the aforementioned techniques during various stages of their manufacture, such as during soaking 702, formation 704, and after formation 706. The battery cells 45-48 of the second batch which were assembled during the second time-period are observed to have minor defects attributed to poor storage in an illustrative example. The difference between the two batches of battery cells are identified using an acoustic wetting score 720 (measured during soaking 702) and is correlated with the battery cells' different lifetime cycling performance (number of cycles to reach 70% initial capacity). By contrast, these differences are not easily observable by standard state-of-the-art electrical methods like formation capacity 722, DC resistance 724, self-discharge rate 726, or cycle life 728. Accordingly, measuring acoustic wetting scores 720 using the above techniques during soaking is seen to provide discernible and actionable insights which are not available using the other methods 722-728.

Furthermore, measuring the quality of battery cells using acoustic signals during soaking can provide the following advantageous characteristics during battery cell development and production: faster optimization of process parameters during development; and the ability for screening and identifying cells that may have been discarded during commercial production due to poor quality, potentially providing opportunities for remedying corresponding defects during the manufacturing process.

Figure 8:
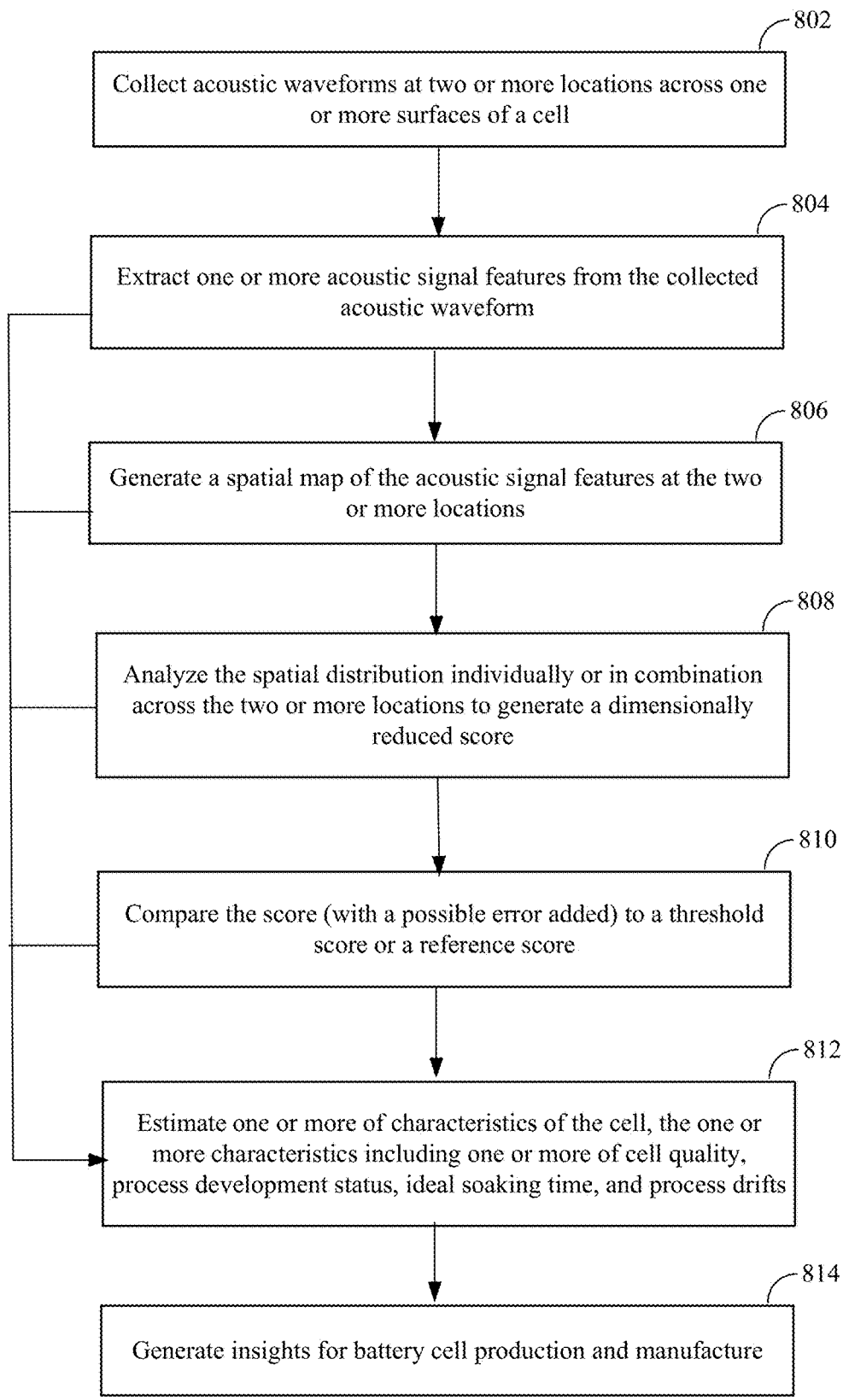
FIG. 8 illustrates a process of collecting and analyzing acoustic waveforms from two or more locations of a surface of a battery cell, according to aspects of this disclosure.

Accordingly, it will be appreciated that example aspects include various methods for performing the processes, functions, and/or algorithms disclosed herein. For example, FIG. 8 illustrates a process 800 for estimating various aspects of battery cell quality, soaking time, process development, etc., using acoustic features according to aspects of this disclosure. The process 800 can include determining acoustic features at two or more locations of the battery cell, the acoustic features based on one or more of acoustic signals travelling through at least one or more portions of the battery cell during one or more points in time or responses to the acoustic signals obtained during one or more points in time, wherein the one or more points in time correspond to one or more stages of electrolyte distribution in the battery cell. The acoustic signals travelling through at least one or more portions of the battery cell can include one or more of acoustic signals transmitted into the battery cell or reflections of the acoustic signals transmitted into the battery cell, while the responses to the acoustic signals can include one or more of responses to the acoustic signals transmitted into the battery cell or responses to the reflections of the acoustic signals transmitted into the battery cell.

For example, at the step 802 of the process 800 includes collecting acoustic waveforms (e.g., the Rx signal 116) at various locations. For example, the sensors 206/306 may be used to collect the response signals at the one or more locations on at least one surface of the battery cell 202/302, over one or more points in time.

The step 804 includes extracting one or more acoustic signal features from the acoustic waveforms. For example, various algorithms (e.g., FFT, statistical functions, etc.) may be used to determine acoustic signal features in time domain, frequency domain, or combinations of time and frequency domains. In some examples, the acoustic signal features may include a centroid (mean) frequency, first break time, first peak, amplitude, standard deviation of frequency, etc., determined from the acoustic signal waveforms collected by the sensors.

In some examples, the process 800 includes determining acoustic features at one or more locations of the battery cell, the acoustic features based on one or more of acoustic signals travelling through at least one or more portions of the battery cell during two or more points in time or responses to the acoustic signals obtained during two or more points in time, wherein the two or more points in time correspond to one or more stages of electrolyte distribution in the battery cell, and determining one or more characteristics of the battery cell based on the acoustic features at the one or more locations of the battery cell. For example, by studying the acoustic features at a single point or location over the course of two or more points in time (e.g., the two dimensional maps for one of the fill levels 352-360, studied over two or more points in time 372-380 in FIG. 3B), can be used to determine characteristics of the battery cell as explained above.

In some examples, the process 800 includes determining acoustic features at two or more locations of the battery cell, the acoustic features based on one or more of acoustic signals travelling through at least one or more portions of the battery cell during one or more points in time or responses to the acoustic signals obtained during one or more points in time, wherein the one or more points in time correspond to one or more stages of electrolyte distribution in the battery cell; and determining one or more characteristics of the battery cell based on the acoustic features at the two or more locations of the battery cell. For example, by studying the acoustic features at two or more locations at one or more points in time (e.g., studying two or more points on the two dimensional maps for at least one of the fill levels 352-360, over one or more points in time 372-380 in FIG. 3B), can be used to determine characteristics of the battery cell as explained above.

In some examples, one or more of the following steps 806, 808, 810 may be performed in any order to reach the step 812 of determining or estimating the one or more characteristics of a battery cell. For example, the step 812 of the process 800 may be reached from the step 804 and/or from one or more of the following steps 806, 808, 810. The specific process steps to be employed may be chosen based on specific needs or goals for the disclosed techniques. Accordingly, before proceeding to describe the following steps 806, 808, 810 in more detail, the step 812 will now be described.

The step 812 is directed to determining one or more characteristics of the battery cell based on the acoustic features at the two or more locations of the battery cell. For example, the step 812 includes estimating one or more characteristics of the battery cell using the information obtained from the acoustic features. The step 812 may further include performing actions such drawing conclusions about, making decisions about, making any modifications, etc., regarding the battery cell's process steps. These actions may be regarding the battery cell quality, process development, manufacturing, soaking times, etc. In the examples described above, determining soaking times for acceptable electrolyte distribution was specifically considered, and accordingly, determining the soaking times can be one of the actions included in the step 812. Since the step 812 may be reached based on an understanding of the acoustic signal features derived from the various locations on the surface, in one example, the process 800 may proceed from the step 804 to the step 812.

In some examples, the process 800 may proceed to the step 806 from the step 804. The step 806 includes creating a two-dimensional map based on the acoustic features at the two or more locations, wherein determining the one or more characteristics of the battery cell based on the acoustic features at the two or more locations of the battery cell comprises determining the one or more characteristics of the battery cell based on the two-dimensional map. For example, a 2D spatial map of the acoustic signal features can be generated, e.g., as shown in the spatial distribution 200 of FIG. 2B.

Some examples further include creating a matrix with two or more two-dimensional maps created using acoustic features obtained at two or more points in time from one or more battery cells at two or more electrolyte fill levels. For example, the spatial maps may be determined for various battery cells, e.g., at different fill levels. The spatial maps may also be generated at different soaking times. Thus, the spatial maps may be organized in the form of the matrix 350 in some examples.

In some examples, the process 800 may proceed to the step 808 from the step 806. The step 808 can include applying a dimension reduction algorithm to the acoustic features obtained at the two or more points in time. For example, the dimension reduction algorithm can be applied to the two-dimensional map to determine a reduced-dimension score. In some examples, example, the spatial distribution of a battery cell may be considered individually or in combination with spatial distributions of other battery cells to generate a dimension-reduced score. For example, the graph 400 with the inhomogeneity index may be created for various battery cells under consideration (e.g., for battery cells having different electrolyte fill levels). Various dimensionality reduction algorithms (e.g., principal component analysis (PCA), uniform manifold approximation and prediction (UMAP), non-negative matrix factorization (NMF)), etc.), may be used in the step 508 to obtain the dimension-reduced metric or score.

In the step 810, the process 800 can include plotting the reduced-dimension score as a function of soaking times for electrolyte distribution in the battery cell, wherein the one or more characteristics comprise ideal soaking times for the battery cell, and the reduced-dimension score comprises an inhomogeneity index or an electrolyte distribution homogeneity index. For example, the dimensionality reduced score may be optionally augmented with an error factor and then compared with a threshold (e.g., the threshold 420). In some cases, such as for the soaking times, the comparison may reveal inhomogeneity status. In some cases, comparisons with a reference battery cell's score may be used to determine potential deviations. The reference battery cell may be a battery cell of similar characteristics and type (e.g., same fill level as the battery cell under test). A reference database may contain scores for various reference battery cells. The reference database may be stored in a computer (e.g., the 110) in communication with the test apparatus 100 shown in FIG. 1A or in any other remote storage location (e.g., a cloud storage).

The step 812 has been previously described. The one or more points in times referred to in the previous step can belong to one or more of process steps comprising soaking, formation, and self-discharge aging of the battery cell, or to one or more charge/discharge cycles of the battery cell. The estimations of the one or more characteristics in the step 812 may be performed using any suitable algorithm that uses the 2D spatial maps and/or scores, and/or comparisons thereof discussed in the preceding steps.

In some examples, the one or more characteristics include one or more of battery cell quality, ideal soaking time, process drifts, or manufacturing defects. For example, the manufacturing defects can include one or more of contamination, dry spots, voids, electrode and separator folds or tears.

In some examples, the one or more characteristics can include battery cell performance corresponding to one or more of teardown analysis, formation capacity, Electrochemical Impedance Spectroscopy (EIS), self-discharge aging, or charge/discharge cycling. For example, the step 812 can further include determining one or more process parameters for electrolyte filling of the battery cell based on the one or more characteristics, the one or more process parameters comprising one or more of a number of fill/vacuum cycles, a fill amount of electrolyte per fill step, vacuum pressure, fill temperature, or electrolyte injection distribution for the battery cell.

In some examples, the one or more characteristics can include determining one or more pre-fill parameters for implementing upstream process and materials optimization of the battery cell based on the one or more characteristics, the one or more pre-fill parameters comprising one or more of an electrodes materials and composition ratio, electrode porosity, separator type, materials, porosity, and coatings; electrolyte chemistry, electrolyte composition, electrolyte viscosity, electrode additives or electrolyte additives.

In some examples, the one or more characteristics can include determining one or more soaking parameters for a soaking process of the electrolyte in the battery cell based on the one or more characteristics, the one or more soaking parameters comprising one or more of soaking temperature, soaking time, stack pressure, voltage (e.g., bump, charge, or hold) during soaking, battery cell orientation, or agitation (e.g., press rolling or vibration) of the battery cell.

In some examples, the process 800 can include comparing the acoustic features to a reference set of acoustic features, the reference set of acoustic features obtained at corresponding two or more locations of a reference battery cell. In some examples, determining one or more characteristics of the battery cell can further be based on comparing the acoustic features to predetermined corresponding threshold values.

Additionally, the estimations obtained in the step 812 can be used to generate insights in the step 814, as discussed further below. For example, one or more insights can be based on the determined one or more characteristics, the insights comprising hints for one or more of process design, process optimization, process monitoring, control, or decisions about downstream processes for manufacturing one or more battery cells.

In the step 814, the insights may be generated using the estimates/actions/decisions obtained in the step 812. The insights that may be used as hints in guiding the production process of the battery cells. For example, in process development the estimated characteristics of a battery cell (e.g., ideal soaking time, etc.) obtained from studying a battery cell during a particular state or iteration of the battery cell manufacturing process can be used to generate corresponding insights such as the soaking time to be used in future iterations. The subsequent next iterations of process design can utilize these insights to potentially alter their soaking times, or otherwise modify their cell design processes by incorporating these insights. In some examples, the insights from the step 814 can be used in monitoring a manufacturing line for drift in quality. In some examples of battery cell production, the insights can deliver real-time feedback into process controls, e.g. to tune parameters to adjust for any incipient deviations. In some examples, the insights can guide decisions on how a production process for cell should proceed in the downstream process steps (e.g., based on wetting scores, the length of time a cell should be soaked for, or how long to a cell which has been soaked should be allowed to age before proceeding to subsequent steps, etc.)

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Accordingly, an aspect of the invention can include a computer-readable media embodying a method of analyzing electrolyte fill distribution in a battery cell. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

Illustrative examples of the disclosure include:

Example 1: A method of analyzing a battery cell, the method comprising: determining acoustic features at two or more locations of the battery cell, the acoustic features based on one or more of acoustic signals travelling through at least one or more portions of the battery cell during one or more points in time or responses to the acoustic signals obtained during one or more points in time, wherein the one or more points in time correspond to one or more stages of electrolyte distribution in the battery cell; and determining one or more characteristics of the battery cell based on the acoustic features at the two or more locations of the battery cell.

Example 2: The method of Example 1, further comprising creating a two-dimensional map based on the acoustic features at the two or more locations, wherein determining the one or more characteristics of the battery cell based on the acoustic features at the two or more locations of the battery cell comprises determining the one or more characteristics of the battery cell based on the two-dimensional map.

Example 3: The method of any of Examples 1 or 2, further comprising creating a matrix with two or more two-dimensional maps created using acoustic features obtained at two or more points in time from one or more battery cells at two or more electrolyte fill levels.

Example 4: The method of any of Examples 1-3, further comprising applying a dimension reduction algorithm on the acoustic features to determine a reduced-dimension score.

Example 5: The method of any of Examples 1-4, further comprising plotting the reduced-dimension score as a function of soaking times for electrolyte distribution in the battery cell, wherein the one or more characteristics comprise ideal soaking times for the battery cell, and the reduced-dimension score comprises an inhomogeneity index or an electrolyte distribution homogeneity index.

Example 6: The method of any of Examples 1-5, wherein the one or more points in times belong to one or more of process steps comprising soaking, formation, and self-discharge aging of the battery cell, or to one or more charge/discharge cycles of the battery cell.

Example 7: The method of any of Examples 1-6, wherein the one or more characteristics include one or more of battery cell quality, ideal soaking time, process drifts, or manufacturing defects.

Example 8: The method of any of Examples 1-7, wherein the manufacturing defects comprise one or more of contamination, dry spots, voids, electrode and separator folds or tears.

Example 9: The method of any of Examples 1-8, wherein the one or more characteristics include battery cell performance corresponding to one or more of teardown analysis, formation capacity, Electrochemical Impedance Spectroscopy (EIS), self-discharge aging, or charge/discharge cycling.

Example 10: The method of any of Examples 1-9, further comprising determining one or more process parameters for electrolyte filling of the battery cell based on the one or more characteristics, the one or more process parameters comprising one or more of a number of fill/vacuum cycles, a fill amount of electrolyte per fill step, vacuum pressure, fill temperature, or electrolyte injection distribution for the battery cell.

Example 11: The method of any of Examples 1-10, further comprising determining one or more pre-fill parameters for implementing upstream process and materials optimization of the battery cell based on the one or more characteristics, the one or more pre-fill parameters comprising one or more of an electrodes materials and composition ratio, electrode porosity, separator materials, electrolyte chemistry, electrolyte composition, electrolyte viscosity, electrode additives or electrolyte additives.

Example 12: The method of any of Examples 1-11, further comprising determining one or more soaking parameters for a soaking process of the electrolyte in the battery cell based on the one or more characteristics, the one or more soaking parameters comprising one or more of soaking temperature, stack pressure, voltage during soaking, battery cell orientation, or agitation of the battery cell.

Example 13: The method of any of Examples 1-12, wherein the acoustic features comprise one or more of a time-of-flight, centroid (mean) frequency, first break time, first peak, amplitude, or standard deviation of frequency of the acoustic signals.

Example 14: The method of any of Examples 1-13, wherein the acoustic signals travelling through at least one or more portions of the battery cell comprise one or more of acoustic signals transmitted into the battery cell or reflections of the acoustic signals transmitted into the battery cell.

Example 15: The method of any of Examples 1-14, wherein the responses to the acoustic signals comprise one or more of responses to the acoustic signals transmitted into the battery cell or responses to the reflections of the acoustic signals transmitted into the battery cell.

Example 16: The method of any of Examples 1-15, wherein the acoustic features are determined from one or more time-domain characteristics, one or more frequency-domain characteristics, or one or more time-frequency domain characteristics of the transmitted acoustic signals or the response signals or combinations thereof.

Example 17: The method of any of Examples 1-16, further comprising comparing the acoustic features to a reference set of acoustic features, the reference set of acoustic features obtained at corresponding two or more locations of a reference battery cell.

Example 18: The method of any of Examples 1-17, wherein determining one or more characteristics of the battery cell is further based on comparing the acoustic features to predetermined corresponding threshold values.

Example 19: The method of any of Examples 1-18, wherein the one or more characteristics comprise a quality of a solid electrolyte interphase (SEI) layer of the battery cell.

Example 20: The method of any of Examples 1-19, further comprising determining one or more insights based on the determined one or more characteristics, the insights comprising hints for one or more of process design, process optimization, process monitoring, control, or decisions about downstream processes for manufacturing one or more battery cells.

Example 21. A non-transitory computer-readable medium having stored thereon computer-readable instructions that, upon being executed by one or more processors, cause the one or more processors to: determine acoustic features at two or more locations of the battery cell, the acoustic features based on one or more of acoustic signals travelling through at least one or more portions of the battery cell during one or more points in time or responses to the acoustic signals obtained during one or more points in time, wherein the one or more points in time correspond to one or more stages of electrolyte distribution in the battery cell; and determine one or more characteristics of the battery cell based on the acoustic features at the two or more locations of the battery cell.

Example 22. A system comprising one or more processors; and memory including instructions that, upon being executed by the processor one or more processors, cause the system to: determine acoustic features at two or more locations of the battery cell, the acoustic features based on one or more of acoustic signals travelling through at least one or more portions of the battery cell during one or more points in time or responses to the acoustic signals obtained during one or more points in time, wherein the one or more points in time correspond to one or more stages of electrolyte distribution in the battery cell; and determine one or more characteristics of the battery cell based on the acoustic features at the two or more locations of the battery cell.

Example 23: A method of analyzing a battery cell according to any of the Examples 1-22, the method comprising: determining acoustic features at one or more locations of the battery cell, the acoustic features based on one or more of acoustic signals travelling through at least one or more portions of the battery cell during two or more points in time or responses to the acoustic signals obtained during two or more points in time, wherein the two or more points in time correspond to one or more stages of electrolyte distribution in the battery cell; and determining one or more characteristics of the battery cell based on the acoustic features at the one or more locations of the battery cell.

What is claimed is:

1. A method of analyzing a battery cell, the method comprising:
   determining acoustic features at two or more locations of the battery cell, the acoustic features based on one or more of acoustic signals travelling through at least one or more portions of the battery cell during one or more points in time or responses to the acoustic signals obtained during one or more points in time, wherein the one or more points in time correspond to one or more stages of electrolyte distribution in the battery cell;
   generating a score based on the acoustic features, the score being an index of homogeneity of electrolyte distribution in the battery cell;
   determining one or more characteristics of the battery cell using the score, the one or more characteristics including at least ideal soaking times for the battery cell; and
   optimizing one or more process parameters for manufacturing the battery cell based on the one or more characteristics.

2. The method of claim 1, further comprising:
   creating a two-dimensional map based on the acoustic features at the two or more locations, wherein determining the one or more characteristics of the battery cell based on the acoustic features at the two or more locations of the battery cell comprises determining the one or more characteristics of the battery cell based on the two-dimensional map.

3. The method of claim 2, further comprising:
   creating a matrix with two or more two-dimensional maps created using acoustic features obtained at two or more points in time from one or more battery cells at two or more electrolyte fill levels.

4. The method of claim 1, further comprising:
   applying a dimension reduction algorithm on the acoustic features to determine the score.

5. The method of claim 4, further comprising:
   plotting the score as a function of soaking times for the electrolyte distribution in the battery cell.

6. The method of claim 1, wherein the one or more points in times belong to one or more of process steps comprising soaking, formation, and self-discharge aging of the battery cell, or to one or more charge/discharge cycles of the battery cell.

7. The method of claim 1, wherein the one or more characteristics further include one or more of battery cell quality, ideal soaking time, process drifts, or manufacturing defects.

8. The method of claim 7, wherein the manufacturing defects comprise one or more of contamination, dry spots, voids, electrode and separator folds or tears.

9. The method of claim 1, wherein the one or more characteristics further include battery cell performance corresponding to one or more of teardown analysis, formation capacity, Electrochemical Impedance Spectroscopy (EIS), self-discharge aging, or charge/discharge cycling.

10. The method of claim 1, wherein the one or more process parameters include one or more of a number of fill/vacuum cycles, a fill amount of electrolyte per fill step, vacuum pressure, fill temperature, or electrolyte injection distribution for the battery cell.

11. The method of claim 1, wherein the one or more process parameters include one or more pre-fill parameters for implementing upstream process and materials optimization of the battery cell based on the one or more characteristics, the one or more pre-fill parameters comprising one or more of an electrodes materials and composition ratio, electrode porosity, separator materials, electrolyte chemistry, electrolyte composition, electrolyte viscosity, electrode additives or electrolyte additives.

12. The method of claim 1, wherein the one or more process parameters include one or more soaking parameters for a soaking process of the electrolyte in the battery cell based on the one or more characteristics, the one or more soaking parameters comprising one or more of soaking temperature, stack pressure, voltage during soaking, battery cell orientation, or agitation of the battery cell.

13. The method of claim 1, wherein the acoustic features comprise one or more of a time-of-flight, centroid (mean) frequency, first break time, first peak, amplitude, or standard deviation of frequency of the acoustic signals.

14. The method of claim 1, wherein the acoustic signals travelling through at least one or more portions of the battery cell comprise one or more of acoustic signals transmitted into the battery cell or reflections of the acoustic signals transmitted into the battery cell.

15. The method of claim 14, wherein the responses to the acoustic signals comprise one or more of responses to the acoustic signals transmitted into the battery cell or responses to the reflections of the acoustic signals transmitted into the battery cell.

16. The method of claim 1, wherein the acoustic features are determined from one or more time-domain characteristics, one or more frequency-domain characteristics, or one or more time-frequency domain characteristics of the acoustic signals or the response signals or combinations thereof.

17. The method of claim 1, further comprising:
    comparing the acoustic features to a reference set of acoustic features, the reference set of acoustic features obtained at corresponding two or more locations of a reference battery cell.

18. The method of claim 1, wherein determining one or more characteristics of the battery cell is further based on comparing the acoustic features to predetermined corresponding threshold values.

19. The method of claim 1, wherein the one or more characteristics comprise a quality of a solid electrolyte interphase (SEI) layer of the battery cell.

20. The method of claim 1, further comprising:
    determining one or more insights based on the determined one or more characteristics, the insights comprising hints for one or more of process design, process optimization, process monitoring, control, or decisions about downstream processes for manufacturing one or more battery cells.

21. A non-transitory computer-readable medium having stored thereon computer-readable instructions that, upon being executed by one or more processors, cause the one or more processors to:
- determine acoustic features at two or more locations of a battery cell, the acoustic features based on one or more of acoustic signals travelling through at least one or more portions of the battery cell during one or more points in time or responses to the acoustic signals obtained during one or more points in time, wherein the one or more points in time correspond to one or more stages of electrolyte distribution in the battery cell;
- generate a score based on the acoustic features, the score being an index of homogeneity of electrolyte distribution in the battery cell; and
- determine one or more characteristics of the battery cell using the score, the one or more characteristics including at least ideal soaking times for the battery cell.

22. A system comprising:
one or more processors; and
memory including instructions that, upon being executed by the processor one or more processors, cause the system to:
- determine acoustic features at two or more locations of the battery cell, the acoustic features based on one or more of acoustic signals travelling through at least one or more portions of the battery cell during one or more points in time or responses to the acoustic signals obtained during one or more points in time, wherein the one or more points in time correspond to one or more stages of electrolyte distribution in the battery cell;
- generate a score based on the acoustic features, the score being an index of homogeneity of electrolyte distribution in the battery cell;
- determine one or more characteristics of the battery cell using the score, the one or more characteristics including at least ideal soaking times for the battery cell; and
- optimize one or more process parameters for manufacturing the battery cell based on the one or more characteristics.

* * * * *